US011805540B2

(12) United States Patent
Taherzadeh Boroujeni et al.

(10) Patent No.: US 11,805,540 B2
(45) Date of Patent: Oct. 31, 2023

(54) TECHNIQUES FOR SELECTION OR INDICATION OF A CHANNEL STATE INFORMATION REPORT PARAMETER

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Junyi Li, Franklin Park, NJ (US); Xiaoxia Zhang, San Diego, CA (US); Iyab Issam Sakhnini, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 17/302,020

(22) Filed: Apr. 21, 2021

(65) Prior Publication Data

US 2021/0337552 A1 Oct. 28, 2021

Related U.S. Application Data

(60) Provisional application No. 63/015,234, filed on Apr. 24, 2020, provisional application No. 63/015,228, filed on Apr. 24, 2020.

(51) Int. Cl.
*H04W 72/08* (2009.01)
*H04W 72/542* (2023.01)
(Continued)

(52) U.S. Cl.
CPC ........ *H04W 72/542* (2023.01); *H04B 7/0626* (2013.01); *H04W 16/28* (2013.01); *H04W 72/046* (2013.01); *H04W 72/23* (2023.01)

(58) Field of Classification Search
CPC . H04W 72/542; H04W 16/28; H04W 72/046; H04W 72/23; H04W 24/10;
(Continued)

(56) References Cited

U.S. PATENT DOCUMENTS

2013/0121270 A1* 5/2013 Chen ............... H04L 1/0028
370/329
2017/0013570 A1* 1/2017 Vajapeyam ....... H04W 74/0833
(Continued)

FOREIGN PATENT DOCUMENTS

CN 109644039 A 4/2019
WO 2018044116 A1 3/2018
(Continued)

OTHER PUBLICATIONS

International Search Report and Written Opinion—PCT/US2021/070444—ISA/EPO—dated Jul. 26, 2021.

*Primary Examiner* — Kiet Tang
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may perform a signal measurement. The UE may select, based at least in part on a result of performing the signal measurement, a channel state information (CSI) report parameter, from a plurality of CSI report parameters. The plurality of CSI report parameters may be included in a CSI reporting configuration configured for the UE. The UE may transmit an indication of the selected CSI report parameter in uplink control information (UCI). Numerous other aspects are provided.

30 Claims, 11 Drawing Sheets

(51) Int. Cl.
*H04B 7/06* (2006.01)
*H04W 16/28* (2009.01)
*H04W 72/044* (2023.01)
*H04W 72/23* (2023.01)

(58) Field of Classification Search
CPC .. H04B 7/0626; H04B 7/0619; H04B 7/0695; H04L 5/00; H04L 1/0027
See application file for complete search history.

(56) References Cited

U.S. PATENT DOCUMENTS

| | | |
|---|---|---|
| 2017/0063479 A1* | 3/2017 | Kim .......................... H04L 5/00 |
| 2017/0164226 A1* | 6/2017 | Wei ..................... H04W 72/542 |
| 2018/0091992 A1 | 3/2018 | Frenne et al. |
| 2019/0081679 A1* | 3/2019 | Davydov .............. H04W 72/23 |
| 2019/0313399 A1* | 10/2019 | Cheng ................... H04L 1/0027 |

FOREIGN PATENT DOCUMENTS

| | | |
|---|---|---|
| WO | 2018142380 A1 | 8/2018 |
| WO | 2020032569 A1 | 2/2020 |

* cited by examiner

TECHNIQUES FOR SELECTION OR INDICATION OF A CHANNEL STATE INFORMATION REPORT PARAMETER

CROSS-REFERENCE TO RELATED APPLICATION

This Patent Application claims priority to U.S. Provisional Patent Application No. 63/015,228, filed on Apr. 24, 2020, entitled "TECHNIQUES FOR SELECTION OF A CHANNEL STATE INFORMATION REPORT PARAMETER BY A USER EQUIPMENT AND INDICATION VIA UPLINK CONTROL INFORMATION," and to U.S. Provisional Patent Application No. 63/015,234, filed on Apr. 24, 2020, entitled "DYNAMIC CHANGE OF PERIODIC CHANNEL STATE INFORMATION REPORT," both of which are assigned to the assignee hereof. The disclosure of the prior Applications is considered part of and is incorporated by reference into this Patent Application.

FIELD OF THE DISCLOSURE

Aspects of the present disclosure generally relate to wireless communication and to techniques and apparatuses for selection or indication of channel state information (CSI) report parameter by a user equipment (UE).

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include performing a signal measurement; selecting, based at least in part on a result of performing the signal measurement, a CSI report parameter, from a plurality of CSI report parameters, the plurality of CSI report parameters being included in a CSI reporting configuration configured for the UE; and transmitting an indication of the selected CSI report parameter in UCI.

In some aspects, the method includes receiving the CSI reporting configuration including the plurality of CSI report parameters.

In some aspects, the CSI reporting configuration is received via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the result of the signal measurement includes at least one of a reference signal received power value, a signal-to-interference-plus-noise ratio value, or a log-likelihood ratio quality value.

In some aspects, the UCI includes an indication of a length of a gap between the UCI and a start of CSI report repetition, or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a physical uplink control channel (PUCCH) format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is received in downlink control information associated with triggering a semi-persistent CSI report.

In some aspects, the selected CSI report parameter is selected based at least in part on criteria included in the CSI reporting configuration.

In some aspects, the criteria include a signal strength threshold, and the selected CSI report parameter is selected based at least in part on whether the result of the signal measurement satisfies the signal strength threshold.

In some aspects, the method includes transmitting a CSI report based at least in part on the selected CSI report parameter.

In some aspects, a method of wireless communication, performed by a base station, may include receiving UCI including an indication of a CSI report parameter selected by a UE, wherein the selected CSI report parameter is one of a plurality of CSI report parameters included in a CSI reporting configuration configured on the UE; and monitoring for a CSI report from the UE based at least in part on the selected CSI report parameter.

In some aspects, the method includes transmitting the CSI reporting configuration including the plurality of CSI report parameters.

In some aspects, the CSI reporting configuration is transmitted via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the UCI includes an indication of a length of a gap between the UCI and a start of CSI report repetition or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is transmitted in downlink control information associated with triggering a semi-persistent CSI report.

In some aspects, the CSI reporting configuration includes criteria associated with selecting the CSI report parameter.

In some aspects, the criteria includes a signal strength threshold associated with selecting the CSI report parameter based at least in part on a result of a signal measurement.

In some aspects, a UE for wireless communication may include a memory and one or more processors operatively coupled to the memory. The memory and the one or more processors may be configured to perform a signal measurement; select, based at least in part on a result of performing the signal measurement, a CSI report parameter, from a plurality of CSI report parameters, the plurality of CSI report parameters being included in a CSI reporting configuration configured for the UE; and transmit an indication of the selected CSI report parameter in UCI.

In some aspects, the UE receives the CSI reporting configuration including the plurality of CSI report parameters.

In some aspects, the CSI reporting configuration is received via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the result of the signal measurement includes at least one of a reference signal received power value, a signal-to-interference-plus-noise ratio value, or a log-likelihood ratio quality value.

In some aspects, the UCI includes an indication of a length of a gap between the UCI and a start of CSI report repetition, or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is received in downlink control information associated with triggering a semi-persistent CSI report.

In some aspects, the selected CSI report parameter is selected based at least in part on criteria included in the CSI reporting configuration.

In some aspects, the criteria include a signal strength threshold, and the selected CSI report parameter is selected based at least in part on whether the result of the signal measurement satisfies the signal strength threshold.

In some aspects, the UE transmits a CSI report based at least in part on the selected CSI report parameter.

In some aspects, a base station for wireless communication may include a memory and one or more processors operatively coupled to the memory. The memory and the one or more processors may be configured to receive UCI including an indication of a CSI report parameter selected by a UE, wherein the selected CSI report parameter is one of a plurality of CSI report parameters included in a CSI reporting configuration configured on the UE; and monitor for a CSI report from the UE based at least in part on the selected CSI report parameter.

In some aspects, the base station transmits the CSI reporting configuration including the plurality of CSI report parameters.

In some aspects, the CSI reporting configuration is transmitted via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the UCI includes an indication of a length of a gap between the UCI and a start of CSI report repetition or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is transmitted in downlink control information associated with triggering a semi-persistent CSI report.

In some aspects, the CSI reporting configuration includes criteria associated with selecting the CSI report parameter.

In some aspects, the criteria includes a signal strength threshold associated with selecting the CSI report parameter based at least in part on a result of a signal measurement.

In some aspects, a non-transitory computer-readable medium may store one or more instructions for wireless communication. The one or more instructions, when executed by one or more processors of a UE, may cause the one or more processors to perform a signal measurement; select, based at least in part on a result of performing the signal measurement, a CSI report parameter, from a plurality of CSI report parameters, the plurality of CSI report parameters being included in a CSI reporting configuration configured for the UE; and transmit an indication of the selected CSI report parameter in UCI.

In some aspects, the UE receives the CSI reporting configuration including the plurality of CSI report parameters.

In some aspects, the CSI reporting configuration is received via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the result of the signal measurement includes at least one of a reference signal received power value, a signal-to-interference-plus-noise ratio value, or a log-likelihood ratio quality value.

In some aspects, the UCI includes an indication of a length of a gap between the UCI and a start of CSI report repetition, or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is received in downlink control information associated with triggering a semi-persistent CSI report.

In some aspects, the selected CSI report parameter is selected based at least in part on criteria included in the CSI reporting configuration.

In some aspects, the criteria include a signal strength threshold, and the selected CSI report parameter is selected based at least in part on whether the result of the signal measurement satisfies the signal strength threshold.

In some aspects, the UE transmits a CSI report based at least in part on the selected CSI report parameter.

In some aspects, a non-transitory computer-readable medium may store one or more instructions for wireless communication. The one or more instructions, when executed by one or more processors of a base station, may cause the one or more processors to receive UCI including an indication of a CSI report parameter selected by a UE, wherein the selected CSI report parameter is one of a plurality of CSI report parameters included in a CSI reporting configuration configured on the UE; and monitor for a CSI report from the UE based at least in part on the selected CSI report parameter.

In some aspects, the base station transmits the CSI reporting configuration including the plurality of CSI report parameters.

In some aspects, the CSI reporting configuration is transmitted via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the UCI includes an indication of a length of a gap between the UCI and a start of CSI report repetition or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is transmitted in downlink control information associated with triggering a semi-persistent CSI report.

In some aspects, the CSI reporting configuration includes criteria associated with selecting the CSI report parameter.

In some aspects, the criteria includes a signal strength threshold associated with selecting the CSI report parameter based at least in part on a result of a signal measurement.

In some aspects, an apparatus for wireless communication may include means for performing a signal measurement; means for selecting, based at least in part on a result of performing the signal measurement, a CSI report parameter, from a plurality of CSI report parameters, the plurality of CSI report parameters being included in a CSI reporting configuration configured for the apparatus; and means for transmitting an indication of the selected CSI report parameter in UCI.

In some aspects, the apparatus receives the CSI reporting configuration including the plurality of CSI report parameters.

In some aspects, the CSI reporting configuration is received via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the result of the signal measurement includes at least one of a reference signal received power value, a signal-to-interference-plus-noise ratio value, or a log-likelihood ratio quality value.

In some aspects, the UCI includes an indication of a length of a gap between the UCI and a start of CSI report repetition, or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is received in downlink control information associated with triggering a semi-persistent CSI report.

In some aspects, the selected CSI report parameter is selected based at least in part on criteria included in the CSI reporting configuration.

In some aspects, the criteria include a signal strength threshold, and the selected CSI report parameter is selected based at least in part on whether the result of the signal measurement satisfies the signal strength threshold.

In some aspects, the apparatus transmits a CSI report based at least in part on the selected CSI report parameter.

In some aspects, an apparatus for wireless communication may include means for receiving UCI including an indication of a CSI report parameter selected by a UE, wherein the selected CSI report parameter is one of a plurality of CSI report parameters included in a CSI reporting configuration configured on the UE; and means for monitoring for a CSI report from the UE based at least in part on the selected CSI report parameter.

In some aspects, the apparatus transmits the CSI reporting configuration including the plurality of CSI report parameters.

In some aspects, the CSI reporting configuration is transmitted via radio resource control signaling.

In some aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In some aspects, the reporting parameter is associated with at least one of whether CSI report repetition is to be performed, a periodicity for CSI reporting, or a payload size for CSI reporting.

In some aspects, the UCI includes an indication of a length of a gap between the UCI and a start of CSI report repetition or an indication of a length of a gap between the UCI and a start of a beam sweeping.

In some aspects, an indication of a length of a gap between the UCI and a start of CSI report repetition, or an indication of a length of a gap between the UCI and a start of a beam sweeping, is included in the CSI reporting configuration.

In some aspects, the UCI includes an indication of a length of a gap between an initial transmission of a CSI report and a start of CSI report repetition, or an indication of a length of a gap between the initial transmission of the CSI report and a start of a beam sweeping.

In some aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

In some aspects, a PUCCH format or a PUCCH option to be used to indicate the selected CSI report parameter is preconfigured on the UE according to a wireless communication standard.

In some aspects, information that identifies a physical uplink control channel format to be used to indicate the selected CSI report parameter is included in the CSI reporting configuration.

In some aspects, an indication to perform the selection of the CSI report parameter, or information that identifies a physical uplink control channel format to be used to indicate the selected CSI report parameter, is transmitted in downlink control information associated with triggering a semi-persistent CSI report.

In some aspects, the CSI reporting configuration includes criteria associated with selecting the CSI report parameter.

In some aspects, the criteria includes a signal strength threshold associated with selecting the CSI report parameter based at least in part on a result of a signal measurement.

In some aspects, a method of wireless communication, performed by a user equipment (UE), may include receiving configuration information indicating two or more channel state information (CSI) report settings for a periodic CSI report; receiving a signal indicating to switch to a selected CSI report setting of the two or more CSI report settings; and transmitting a CSI report in accordance with the selected CSI report setting.

In some aspects, a UE for wireless communication may include memory and one or more processors operatively coupled to the memory. The memory and the one or more processors may be configured to receive configuration information indicating two or more CSI report settings for a periodic CSI report; receive a signal indicating to switch to a selected CSI report setting of the two or more CSI report settings; and transmit a CSI report in accordance with the selected CSI report setting.

In some aspects, a non-transitory computer-readable medium may store one or more instructions for wireless communication. The one or more instructions, when executed by one or more processors of a UE, may cause the one or more processors to receive configuration information indicating two or more CSI report settings for a periodic CSI report; receive a signal indicating to switch to a selected CSI report setting of the two or more CSI report settings; and transmit a CSI report in accordance with the selected CSI report setting.

In some aspects, an apparatus for wireless communication may include means for receiving configuration information indicating two or more CSI report settings for a periodic CSI report; means for receiving a signal indicating to switch to a selected CSI report setting of the two or more CSI report settings; and means for transmitting a CSI report in accordance with the selected CSI report setting.

In some aspects, a method of wireless communication, performed by a base station, may include transmitting configuration information indicating two or more CSI report settings for a periodic CSI report; transmitting a signal indicating to switch to a selected CSI report setting of the two or more CSI report settings; and receiving a CSI report in accordance with the selected CSI report setting.

In some aspects, a base station for wireless communication may include memory and one or more processors operatively coupled to the memory. The memory and the one or more processors may be configured to transmit configuration information indicating two or more CSI report settings for a periodic CSI report; transmit a signal indicating to switch to a selected CSI report setting of the two or more CSI report settings; and receive a CSI report in accordance with the selected CSI report setting.

In some aspects, a non-transitory computer-readable medium may store one or more instructions for wireless communication. The one or more instructions, when executed by one or more processors of a base station, may cause the one or more processors to transmit configuration information indicating two or more CSI report settings for a periodic CSI report; transmit a signal indicating to switch to a selected CSI report setting of the two or more CSI report settings; and receive a CSI report in accordance with the selected CSI report setting.

In some aspects, an apparatus for wireless communication may include means for transmitting configuration information indicating two or more CSI report settings for a periodic CSI report; means for transmitting a signal indicating to switch to a selected CSI report setting of the two or more CSI report settings; and means for receiving a CSI report in accordance with the selected CSI report setting.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
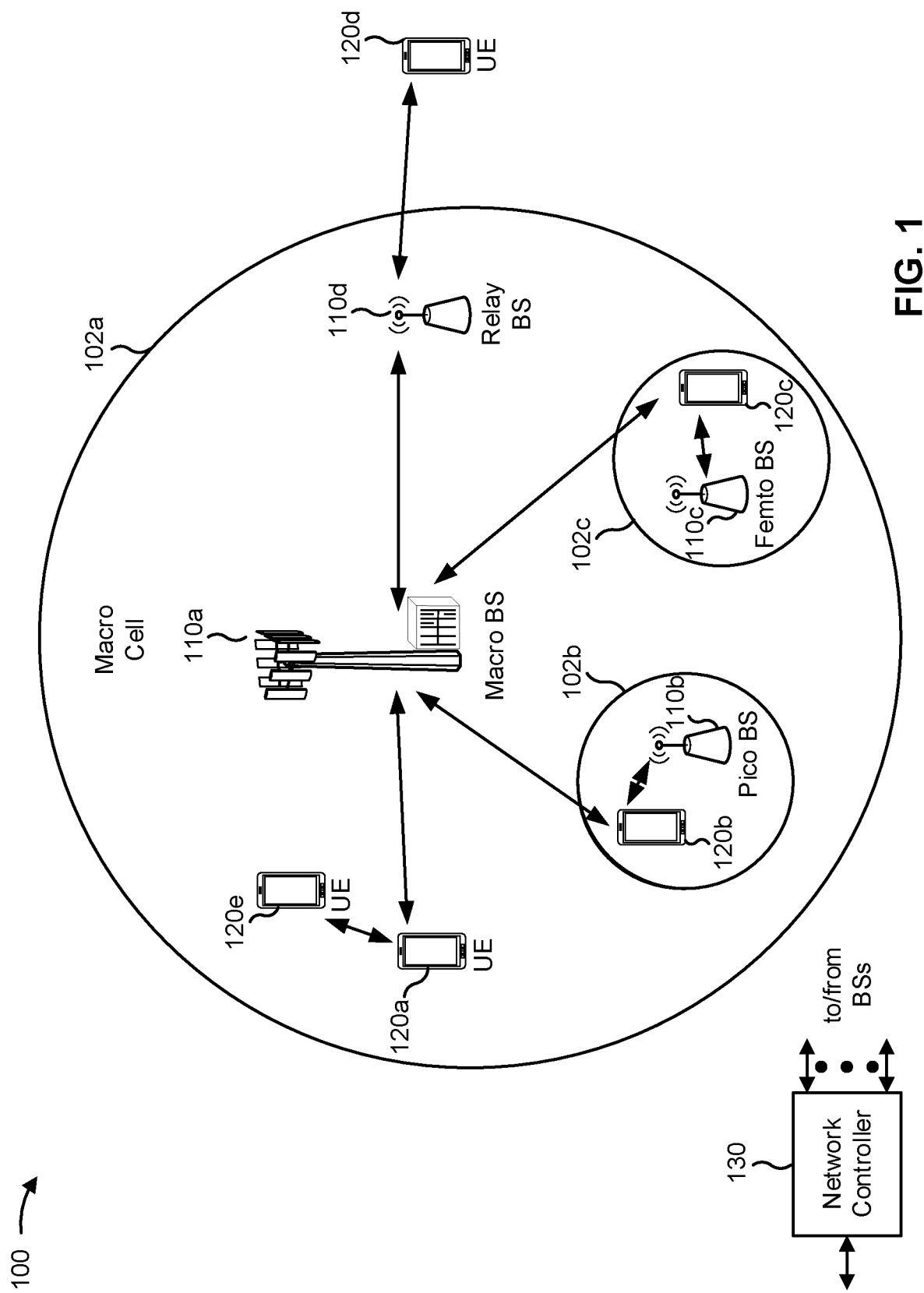
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
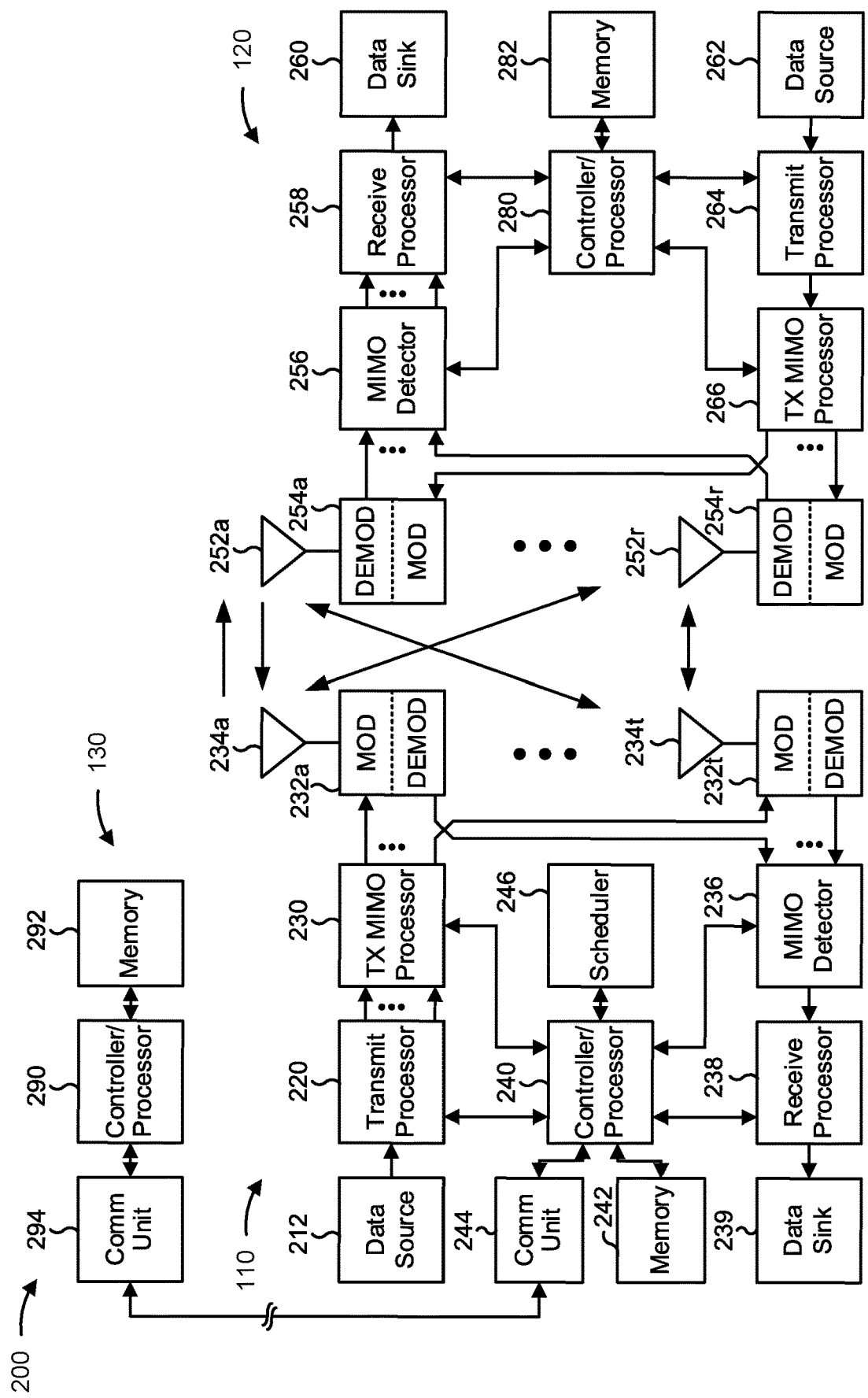
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with selection of a CSI report parameter by a UE, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions.

In some aspects, UE 120 may include means for performing a signal measurement; means for selecting, based at least in part on a result of performing the signal measurement, a channel state information (CSI) report parameter, from a plurality of CSI report parameters, the plurality of CSI report parameters being included in a CSI reporting configuration configured for the UE; means for transmitting an indication of the selected CSI report parameter in uplink control information (UCI); and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving UCI including an indication of a CSI report parameter selected by a UE 120, wherein the selected CSI report parameter is one of a plurality of CSI report parameters included in a CSI reporting configuration configured on the UE; means for monitoring for a CSI report from the UE 120 based at least in part on the selected CSI report parameter; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, UE 120 may include means for receiving configuration information indicating two or more channel state information (CSI) report settings for a periodic CSI report; means for receiving a signal indicating to switch to a selected CSI report setting of the two or more CSI report settings; means for transmitting a CSI report in accordance with the selected CSI report setting; means for switching to the selected CSI report setting; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting configuration information indicating two or more CSI report settings for a periodic CSI report; means for transmitting a signal indicating to switch to a selected CSI report setting of the two or more CSI report settings; means for receiving a CSI report in accordance with the selected CSI report setting; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
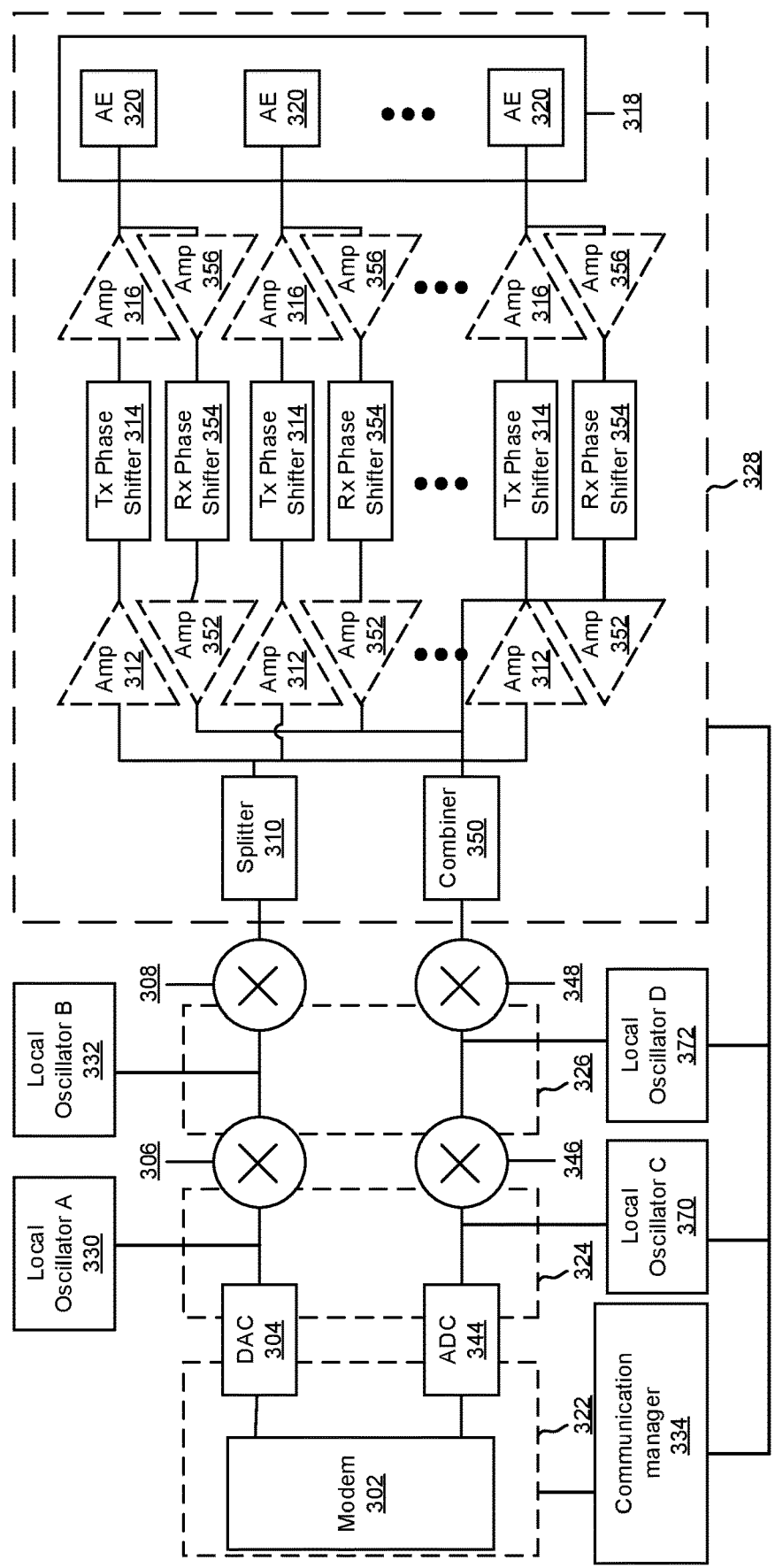
FIG. 3 is a diagram illustrating an example beamforming architecture that supports unicast coverage in a millimeter wave (mmW) channel, in accordance with the present disclosure.

FIG. 3 is a diagram illustrating an example beamforming architecture 300 that supports unicast coverage in a millimeter wave (mmW) channel, in accordance with the present disclosure. In some aspects, architecture 300 may implement aspects of wireless network 100. In some aspects, architecture 300 may be implemented in a transmitting device (e.g., a first wireless communication device, UE, or base station) and/or a receiving device (e.g., a second wireless communication device, UE, or base station), as described herein.

Broadly, FIG. 3 is a diagram illustrating example hardware components of a wireless communication device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 300 includes a modem (modulator/demodulator) 302, a digital to analog converter (DAC) 304, a first mixer 306, a second mixer 308, and a splitter 310. The architecture 300 also includes multiple first amplifiers 312, multiple phase shifters 314, multiple second amplifiers 316, and an antenna array 318 that includes multiple antenna elements 320.

Transmission lines or other waveguides, wires, traces, and/or the like are shown connecting the various components to illustrate how signals to be transmitted may travel between components. Reference numbers 322, 324, 326, and 328 indicate regions in the architecture 300 in which different types of signals travel or are processed. Specifically, reference number 322 indicates a region in which digital baseband signals travel or are processed, reference number 324 indicates a region in which analog baseband signals travel or are processed, reference number 326 indicates a region in which analog intermediate frequency (IF) signals travel or are processed, and reference number 328 indicates a region in which analog radio frequency (RF) signals travel or are processed. The architecture also includes a local oscillator A 330, a local oscillator B 332, and a communication manager 334.

Each of the antenna elements 320 may include one or more sub-elements for radiating or receiving RF signals. For example, a single antenna element 320 may include a first sub-element cross-polarized with a second sub-element that can be used to independently transmit cross-polarized signals. The antenna elements 320 may include patch antennas, dipole antennas, or other types of antennas arranged in a linear pattern, a two dimensional pattern, or another pattern. A spacing between antenna elements 320 may be such that signals with a desired wavelength transmitted separately by the antenna elements 320 may interact or interfere (e.g., to form a desired beam). For example, given an expected range of wavelengths or frequencies, the spacing may provide a quarter wavelength, half wavelength, or other fraction of a wavelength of spacing between neighboring antenna elements 320 to allow for interaction or interference of signals transmitted by the separate antenna elements 320 within that expected range.

The modem 302 processes and generates digital baseband signals and may also control operation of the DAC 304, first and second mixers 306, 308, splitter 310, first amplifiers 312, phase shifters 314, and/or the second amplifiers 316 to transmit signals via one or more or all of the antenna elements 320. The modem 302 may process signals and control operation in accordance with a communication standard such as a wireless standard discussed herein. The DAC 304 may convert digital baseband signals received from the modem 302 (and that are to be transmitted) into analog baseband signals. The first mixer 306 upconverts analog baseband signals to analog IF signals within an IF using a local oscillator A 330. For example, the first mixer 306 may mix the signals with an oscillating signal generated by the local oscillator A 330 to "move" the baseband analog signals to the IF. In some cases, some processing or filtering (not shown) may take place at the IF. The second mixer 308 upconverts the analog IF signals to analog RF signals using the local oscillator B 332. Similar to the first mixer, the second mixer 308 may mix the signals with an oscillating signal generated by the local oscillator B 332 to "move" the IF analog signals to the RF or the frequency at which signals will be transmitted or received. The modem 302 and/or the communication manager 334 may adjust the frequency of local oscillator A 330 and/or the local oscillator B 332 so that a desired IF and/or RF frequency is produced and used to facilitate processing and transmission of a signal within a desired bandwidth.

In the illustrated architecture 300, signals upconverted by the second mixer 308 are split or duplicated into multiple signals by the splitter 310. The splitter 310 in architecture 300 splits the RF signal into multiple identical or nearly identical RF signals. In other examples, the split may take place with any type of signal, including with baseband digital, baseband analog, or IF analog signals. Each of these signals may correspond to an antenna element 320, and the signal travels through and is processed by amplifiers 312, 316, phase shifters 314, and/or other elements corresponding to the respective antenna element 320 to be provided to and transmitted by the corresponding antenna element 320 of the antenna array 318. In one example, the splitter 310 may be an active splitter that is connected to a power supply and provides some gain so that RF signals exiting the splitter 310 are at a power level equal to or greater than the signal entering the splitter 310. In another example, the splitter 310 is a passive splitter that is not connected to power supply and the RF signals exiting the splitter 310 may be at a power level lower than the RF signal entering the splitter 310.

After being split by the splitter 310, the resulting RF signals may enter an amplifier, such as a first amplifier 312, or a phase shifter 314 corresponding to an antenna element 320. The first and second amplifiers 312, 316 are illustrated with dashed lines because one or both of them might not be necessary in some aspects. In some aspects, both the first amplifier 312 and second amplifier 316 are present. In some aspects, neither the first amplifier 312 nor the second amplifier 316 is present. In some aspects, one of the two amplifiers 312, 316 is present but not the other. By way of example, if the splitter 310 is an active splitter, the first amplifier 312 may not be used. By way of further example, if the phase shifter 314 is an active phase shifter that can provide a gain, the second amplifier 316 might not be used.

The amplifiers 312, 316 may provide a desired level of positive or negative gain. A positive gain (positive dB) may be used to increase an amplitude of a signal for radiation by a specific antenna element 320. A negative gain (negative dB) may be used to decrease an amplitude and/or suppress radiation of the signal by a specific antenna element. Each of the amplifiers 312, 316 may be controlled independently (e.g., by the modem 302 or the communication manager 334) to provide independent control of the gain for each antenna element 320. For example, the modem 302 and/or the communication manager 334 may have at least one control line connected to each of the splitter 310, first amplifiers 312, phase shifters 314, and/or second amplifiers 316 that may be used to configure a gain to provide a desired amount of gain for each component and thus each antenna element 320.

The phase shifter 314 may provide a configurable phase shift or phase offset to a corresponding RF signal to be transmitted. The phase shifter 314 may be a passive phase shifter not directly connected to a power supply. Passive phase shifters might introduce some insertion loss. The second amplifier 316 may boost the signal to compensate for the insertion loss. The phase shifter 314 may be an active phase shifter connected to a power supply such that the active phase shifter provides some amount of gain or prevents insertion loss. The settings of each of the phase shifters 314 are independent, meaning that each can be set to provide a desired amount of phase shift or the same amount of phase shift or some other configuration. The modem 302 and/or the communication manager 334 may have at least one control line connected to each of the phase shifters 314 and which may be used to configure the phase shifters 314 to provide desired amounts of phase shift or phase offset between antenna elements 320.

In the illustrated architecture 300, RF signals received by the antenna elements 320 are provided to one or more of first amplifiers 356 to boost the signal strength. The first amplifiers 356 may be connected to the same antenna arrays 318 (e.g., for time division duplex (TDD) operations). The first amplifiers 356 may be connected to different antenna arrays 318. The boosted RF signal is input into one or more of phase shifters 354 to provide a configurable phase shift or phase offset for the corresponding received RF signal. The phase shifter 354 may be an active phase shifter or a passive phase shifter. The settings of the phase shifters 354 are independent, meaning that each can be set to provide a desired amount of phase shift or the same amount of phase shift or some other configuration. The modem 302 and/or the communication manager 334 may have at least one control line connected to each of the phase shifters 354 and which may be used to configure the phase shifters 354 to provide a desired amount of phase shift or phase offset between antenna elements 320.

The outputs of the phase shifters 354 may be input to one or more second amplifiers 352 for signal amplification of the phase shifted received RF signals. The second amplifiers 352 may be individually configured to provide a configured amount of gain. The second amplifiers 352 may be individually configured to provide an amount of gain to ensure that the signals input to combiner 350 have the same magnitude. The amplifiers 352 and/or 356 are illustrated in dashed lines because they might not be necessary in some aspects. In some aspects, both the amplifier 352 and the amplifier 356 are present. In another aspect, neither the amplifier 352 nor the amplifier 356 are present. In other aspects, one of the amplifiers 352, 356 is present but not the other.

In the illustrated architecture 300, signals output by the phase shifters 354 (via the amplifiers 352 when present) are combined in combiner 350. The combiner 350 in architecture 300 combines the RF signal into a signal. The combiner 350 may be a passive combiner (e.g., not connected to a power source), which may result in some insertion loss. The combiner 350 may be an active combiner (e.g., connected to a power source), which may result in some signal gain. When combiner 350 is an active combiner, it may provide a different (e.g., configurable) amount of gain for each input signal so that the input signals have the same magnitude when they are combined. When combiner 350 is an active combiner, the combiner 350 may not need the second amplifier 352 because the active combiner may provide the signal amplification.

The output of the combiner 350 is input into mixers 348 and 346. Mixers 348 and 346 generally down convert the received RF signal using inputs from local oscillators 372 and 370, respectively, to create intermediate or baseband signals that carry the encoded and modulated information. The output of the mixers 348 and 346 are input into an analog-to-digital converter (ADC) 344 for conversion to analog signals. The analog signals output from ADC 344 is input to modem 302 for baseband processing, such as decoding, de-interleaving, and/or the like.

The architecture 300 is given by way of example only to illustrate an architecture for transmitting and/or receiving signals. In some cases, the architecture 300 and/or each portion of the architecture 300 may be repeated multiple times within an architecture to accommodate or provide an arbitrary number of RF chains, antenna elements, and/or antenna panels. Furthermore, numerous alternate architectures are possible and contemplated. For example, although only a single antenna array 318 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions.

Furthermore, mixers, splitters, amplifiers, phase shifters and other components may be located in different signal type areas (e.g., represented by different ones of the reference numbers 322, 324, 326, 328) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 310, amplifiers 312, 316, or phase shifters 314 may be located between the DAC 304 and the first mixer 306 or between the first mixer 306 and the second mixer 308. In one example, the functions of one or more of the components may be combined into one component. For example, the phase shifters 314 may perform amplification to include or replace the first and/or or second amplifiers 312, 316. By way of another example, a phase shift may be implemented by the second mixer 308 to obviate the need for a separate phase shifter 314. This technique is sometimes called local oscillator (LO) phase shifting. In some aspects of this configuration, there may be multiple IF to RF mixers (e.g., for each antenna element chain) within the second mixer 308, and the local oscillator B 332 may supply different local oscillator signals (with different phase offsets) to each IF to RF mixer.

The modem 302 and/or the communication manager 334 may control one or more of the other components 304 through 372 to select one or more antenna elements 320 and/or to form beams for transmission of one or more signals. For example, the antenna elements 320 may be individually selected or deselected for transmission of a signal (or signals) by controlling an amplitude of one or more corresponding amplifiers, such as the first amplifiers 312 and/or the second amplifiers 316. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 320, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 318) can be dynamically controlled by modifying the phase shifts or phase offsets imparted by the phase shifters 314 and amplitudes imparted by the amplifiers 312, 316 of the multiple signals relative to each other. The communication manager 334 may be located partially or fully within one or more other components of the architecture 300. For example, the communication manager 334 may be located within the modem 302 in some aspects.

The communication manager 334, controller/processor 280, receive processor 280, and/or the like may manage the measurement of beams by the architecture 300. For example, this measurement may include the determination of channel state information (CSI) based at least in part on a CSI report setting. The CSI may be based at least in part on a Layer 1 measurement, such as a Layer 1 reference signal received power (RSRP), a Layer 1 signal to interference plus noise (SINR) value, a channel quality indicator (CQI), a precoding matrix indicator (PMI), a CSI reference signal (CSI-RS) Resource Indicator (CRI), a strongest layer indication (SLI), a rank indication (RI), and/or the like. L1-RSRP and/or L1-SINR may be used for beam selection based at least in part on interference. Techniques and apparatuses described herein provide dynamic indication of a CSI report setting for determination and reporting of the CSI, or selection of a CSI report setting based at least in part on a signal measurement and indication of the selected CSI report setting via UCI.

As indicated above, FIG. 3 is provided as an example. Other examples may differ from what is described with regard to FIG. 3.

In wireless communications, CSI refers to known channel properties of a communication link. Generally, CSI describes how a signal propagates from a transmitter to a receiver and represents the combined effect of, for example, scattering, fading, and power decay with distance.

In some wireless communication systems, such as an NR system, a UE (e.g., a UE 120) may be configured to report CSI to a base station (e.g., a base station 110). A CSI report provided by the UE may include information associated with, for example, a channel quality indicator (CQI), a precoding matrix indicator (PMI), a CSI reference signal resource indicator (CRI), a strongest layer indication (SLI), a rank indication (RI), a layer 1 (L1) reference signal received power (RSRP), an L1 signal-to-interference-plus-noise ratio (SINR), or the like.

In a wireless communication system, such as an NR system, there are three types of CSI reporting: periodic, semi-persistent, and aperiodic. A periodic CSI report can be carried on a short PUCCH or a long PUCCH. A semi-persistent CSI report can be carried on a long PUCCH or a physical uplink shared channel (PUSCH). Resources and/or a modulation and coding scheme (MCS) for a semi-persistent CSI reporting carried on a PUSCH can be allocated semi-persistently using downlink control information (DCI). Further, semi-persistent CSI reporting supports Type II with a minimum periodicity of 5 milliseconds (ms), and is not supported for aperiodic CSI reference signals. Periodic CSI reporting and semi-persistent CSI reporting support periodicities of 5 slots, 10 slots, 20 slots, 40 slots, 80 slots, 160 slots, and 320 slots. An aperiodic CSI report can be carried on a PUSCH multiplexed with or without uplink data.

In some wireless communication systems, such as an NR system, an L1-RSRP and/or an L1-SINR may be used for beam management. For example, an L1-SINR can be used for beam selection considering interference (e.g., with a similar format as L1-RSRP). In general, up to four beams can be reported per configured report. Here, an absolute SINR value can be reported for a first reported beam (e.g., a beam with a highest SINR), and differential SINR values are reported for each other beam, where a given differential SINR is computed with respect to the SINR associated with the first beam (e.g., the beam with the highest SINR).

CSI measurement and reporting may be based at least in part on a CSI reporting configuration. A CSI reporting configuration may be semi-statically configured (e.g., using radio resource control (RRC) signaling and/or the like). The CSI reporting configuration may identify a periodicity for CSI reporting, a reference signal for CSI reporting, a resource associated with CSI reporting, and/or the like. CSI reporting can be performed periodically, semi-persistently, or aperiodically. Aperiodic CSI reporting can be triggered, whereas periodic and semi-persistent CSI reporting can be configured to be performed in accordance with an interval.

Reliability of a CSI report, especially an L1-RSRP and an L1-SINR, is important for beam reliability to support, for example, unicast coverage in frequency range 2 (FR2) (e.g., since beam management may be needed on a more frequent basis for unicast communications in FR2). Notably, an L1-RSRP or an L1-SINR can be relatively large (e.g., approximately 20 bits), which may result in poor coverage of a physical uplink control channel (PUCCH) that carries a CSI report including such information. When combined with a periodic CSI report, the larger size of CSI feedback in NR may cause coverage issues and poor throughput. For example, channel conditions at the UE may change more quickly than a periodic CSI reporting configuration can be updated (e.g., on a slot to slot basis, in some cases), so the CSI feedback of the CSI report may be unreliable, thereby reducing efficiency of the network and using computing resources associated with retransmitting the CSI feedback. This may be exacerbated for larger CSI reports, such as those including L1-RSRP/L1-SINR information, and for periodic CSI reporting using longer periodicities.

Figure 4:
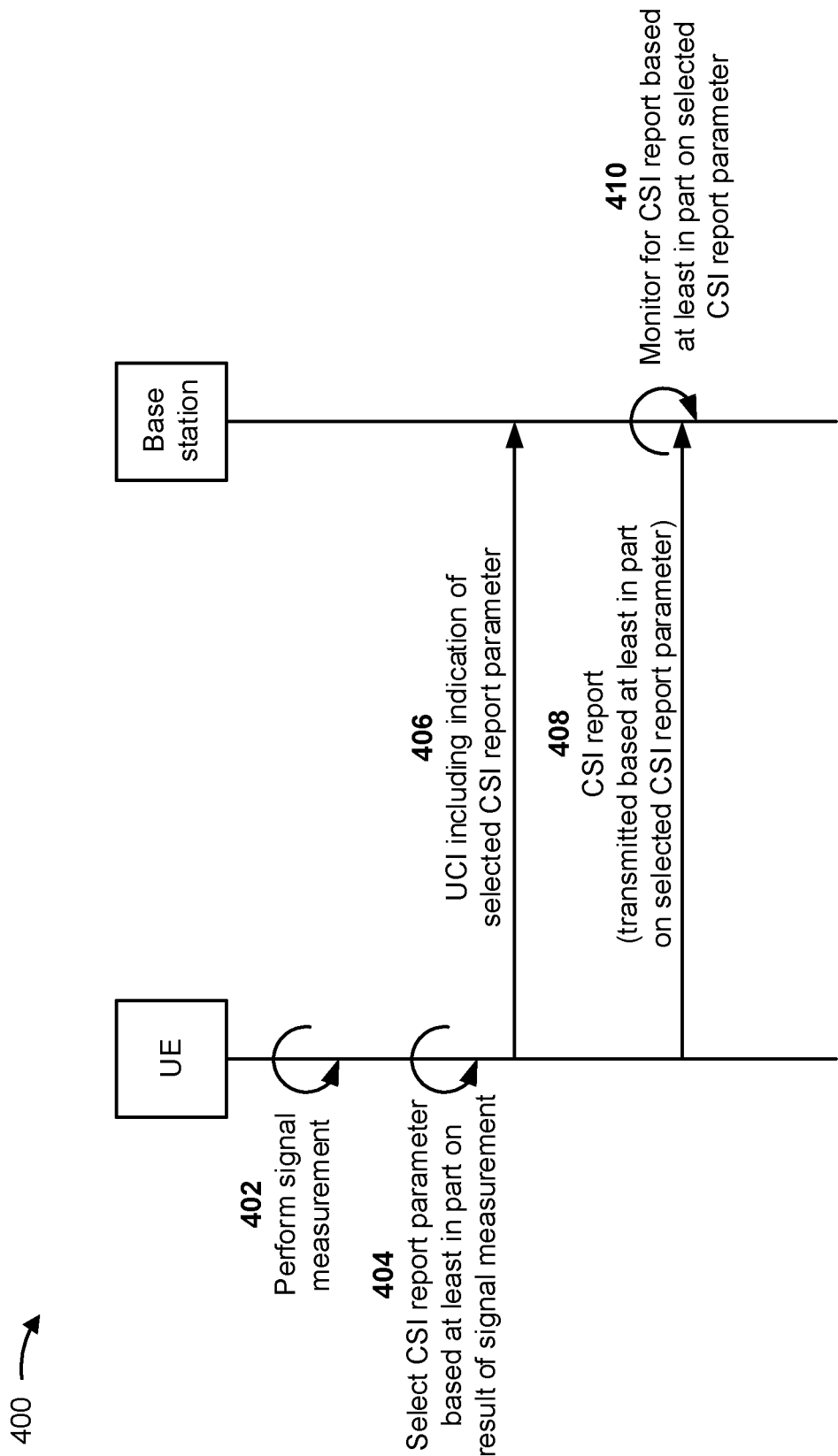
FIG. 4 is a diagram illustrating an example associated with selection of a CSI report parameter by a UE and indication via UCI, in accordance with the present disclosure.

Some aspects described herein provide techniques and apparatuses for selection of a CSI report parameter (or a CSI report setting associated with a CSI report parameter) by a UE, such as based at least in part on a measurement by the UE or a dynamic signaling of the CSI report parameter. Some techniques and apparatuses described herein provide indication of the selected CSI report parameter via UCI. In some aspects, selection of the CSI report parameter by the UE, and indication of the selected CSI report parameter in UCI may improve coverage of the CSI report, thereby increasing reliability of beam management (e.g., for unicast channels in FR2) performed based at least in part on the CSI report. In some aspects, the UE may switch between two or more CSI report settings based at least in part on the dynamic signaling. For example, the two or more CSI report settings may identify one or more different CSI report parameters, one or more different CSI reporting resources, and/or the like. In some aspects, one or more of the CSI report settings (or CSI report parameters associated with the CSI report settings) may be associated with a coverage enhanced mode, or may be configured to provide improved coverage relative to another CSI report setting or CSI reporting configuration. This may include a configured grant, multiple repetitions of the PUCCH, and/or the like. Thus, flexibility of a CSI reporting configuration of a UE is improved and reliability of CSI feedback transmitted by the UE is improved. Furthermore, network resources may be conserved that would otherwise be used to reconfigure a CSI reporting configuration semi-statically and/or to retransmit failed CSI feedback FIG. 4 is a diagram illustrating an example 400 associated with selection of a CSI report parameter by a UE (e.g., a UE 120) and indication via UCI, in accordance with the present disclosure.

As shown by reference 402, the UE may perform a signal measurement. For example, the UE may measure a received power of a reference signal (e.g., a CSI reference signal (CSI-RS)) transmitted by a base station (e.g., a base station 110). In some aspects, a result of the signal measurement may, for example, a L1-RSRP value, an L1-SINR value, a log-likelihood ratio (LLR) quality value, or the like.

As shown by reference 404, the UE may select, based at least in part on the result of performing the signal measurement, a CSI report parameter. In some aspects, the UE may select the CSI report parameter from a plurality of CSI report parameters included in a CSI reporting configuration configured for the UE. That is, two or more configured CSI report parameters may be configured for the UE in a CSI reporting configuration, and the UE may, dynamically select the CSI report parameter based at least in part on the result of the signal measurement.

In some aspects, the UE may receive the CSI reporting configuration including the plurality of CSI report parameters from the base station (e.g., via radio resource control (RRC) signaling).

In some aspects, as noted above, the CSI reporting configuration may include a plurality of CSI report parameters. Here, each CSI report parameter may include information indicating a parameter based at least in part on which the UE is to generate and/or transmit a CSI report.

For example, in some aspects, a first CSI report parameter of the plurality of CSI report parameters indicates a first setting for a reporting parameter, and a second CSI report parameter of the plurality of CSI report parameters indicates a second setting for the reporting parameter. As a particular example, the reporting parameter may be associated with whether CSI report repetition is to be performed (e.g., whether the UE is to transmit a CSI report multiple times to improve coverage). In this example, a first CSI report parameter may indicate CSI report repetition is enabled, and a second CSI report parameter may indicate that CSI report repetition is disabled. As another example, the reporting parameter may be associated with a periodicity for CSI reporting. In this example, a first CSI report parameter may indicate a first periodicity for CSI reporting (e.g., a comparatively shorter periodicity to improve coverage), and a second CSI report parameter may indicate a second periodicity for CSI reporting (e.g., a comparatively longer periodicity). As another example, the reporting parameter may be associated with a payload size for CSI reporting. In this example, a first CSI report parameter may indicate a first payload size for CSI reporting (e.g., a comparatively smaller payload size to improve coverage), and a second CSI report parameter may indicate a second payload size for CSI reporting (e.g., a comparatively larger payload size).

In some aspects, the UE may select the CSI report parameter based at least in part on criteria included in the CSI reporting configuration. In some aspects, the criteria may include, for example, a signal strength threshold. In such a scenario, the UE may select the CSI report parameter based at least in part on whether the result of the signal measurement satisfies the signal strength threshold. For example, if a determined RSRP value does not satisfy the signal strength threshold, then the UE may select a reporting parameter such that CSI report repetition is enabled. Alternatively, if the determined RSRP value satisfies the signal strength threshold, then the UE may select a reporting parameter such that CSI report repetition is disabled.

As shown by reference 406, the UE may transmit, and the base station may receive, an indication of the selected CSI report parameter in UCI. That is, the UE may transmit UCI including an indication of the CSI report parameter selected by the UE.

In some aspects, the UCI may further include an indication of a length of a gap between the UCI and a start of CSI report repetition (e.g., when the CSI report parameter indicates that CSI report repetition is enabled), or an indication of a length of a gap between the UCI and a start of a beam sweeping. That is, in some aspects, the UCI may indicate a gap between the UCI transmission and CSI report repetition or a gap between the UCI transmission and a performance of beam sweeping.

Alternatively, in some aspects, an indication of the length of the gap between the UCI and the start of CSI report repetition, or the indication of the length of the gap between the UCI and the start of the beam sweeping may be included in the CSI reporting configuration. In such a scenario, the gap need not be indicated in UCI since the base station already has access to the CSI reporting configuration.

In some aspects, the UCI may further include an indication of a length of a gap between an initial transmission of a CSI report and a start of CSI report repetition (e.g., when the CSI report parameter indicates that CSI report repetition is enabled), or an indication of a length of a gap between the initial transmission of the CSI report and a start of a beam sweeping. That is, in some aspects, the UCI may indicate a gap between an initial transmission of the CSI report and an activation of CSI report repetition or a gap between the initial transmission of the CSI report and an activation of beam sweeping.

Alternatively, in some aspects, an indication of the length of the gap between the initial transmission of the CSI report and the start of CSI report repetition, or an indication of the length of the gap between the initial transmission of the CSI report and the start of a beam sweeping, may be included in the CSI reporting configuration. In such a scenario, the gap need not be indicated in UCI since the base station already has access to the CSI reporting configuration.

In some aspects, a PUCCH format or a PUCCH option to be used to indicate the selected CSI report parameter is preconfigured on the UE according to a wireless communication standard. That is, the PUCCH format or the PUCCH option for indicating the CSI report parameter selected by the UE may be specified in a standard specification (e.g., the PUCCH format may be restricted to PUCCH format 0, PUCCH format 1, or the like). Alternatively, in some aspects, information that identifies the format to be used to indicate the selected CSI report parameter may be included in the CSI reporting configuration.

In some aspects, the UE may receive an indication to perform the selection of the CSI report parameter (e.g., an indication that the UE is to perform CSI report parameter selection), or information that identifies a PUCCH format to be used to indicate the selected CSI report parameter, in DCI transmitted by the base station (e.g., DCI associated with triggering a semi-persistent CSI report).

As shown by reference 408, the UE may transmit a CSI report based at least in part on the selected CSI report parameter. Further, as shown by reference 410, the base station may monitor for the CSI report from the UE based at least in part on the selected CSI report parameter.

In some aspects, depending on the CSI report parameter selected by the UE, the CSI report may be a coverage enhanced CSI report. A coverage enhanced CSI report includes a CSI report that is generated and/or transmitted in a manner so as to improve coverage of the CSI report (e.g., to improve a likelihood that the base station will receive and successfully decode the CSI report). In some aspects, coverage enhancement can be provided through CSI report repetition, meaning that the CSI report is transmitted by the UE at least twice. Thus, in some aspects, transmitting the CSI report includes performing CSI report repetition.

In some aspects, the UE may transmit, and the base station may monitor for, the CSI report based at least in part on the selected CSI report parameter. For example, the selected CSI report parameter may indicate a setting for a reporting parameter associated with CSI reporting (e.g., whether CSI report repetition is enabled, a periodicity, a payload size, and/or the like), as described above. Here, the UE may transmit, and the base station may monitor for, the CSI report based at least in part on the setting for the reporting parameter indicated by the selected CSI report parameter.

As indicated above, FIG. 4 is provided as an example. Other examples may differ from what is described with respect to FIG. 4.

Figure 5:
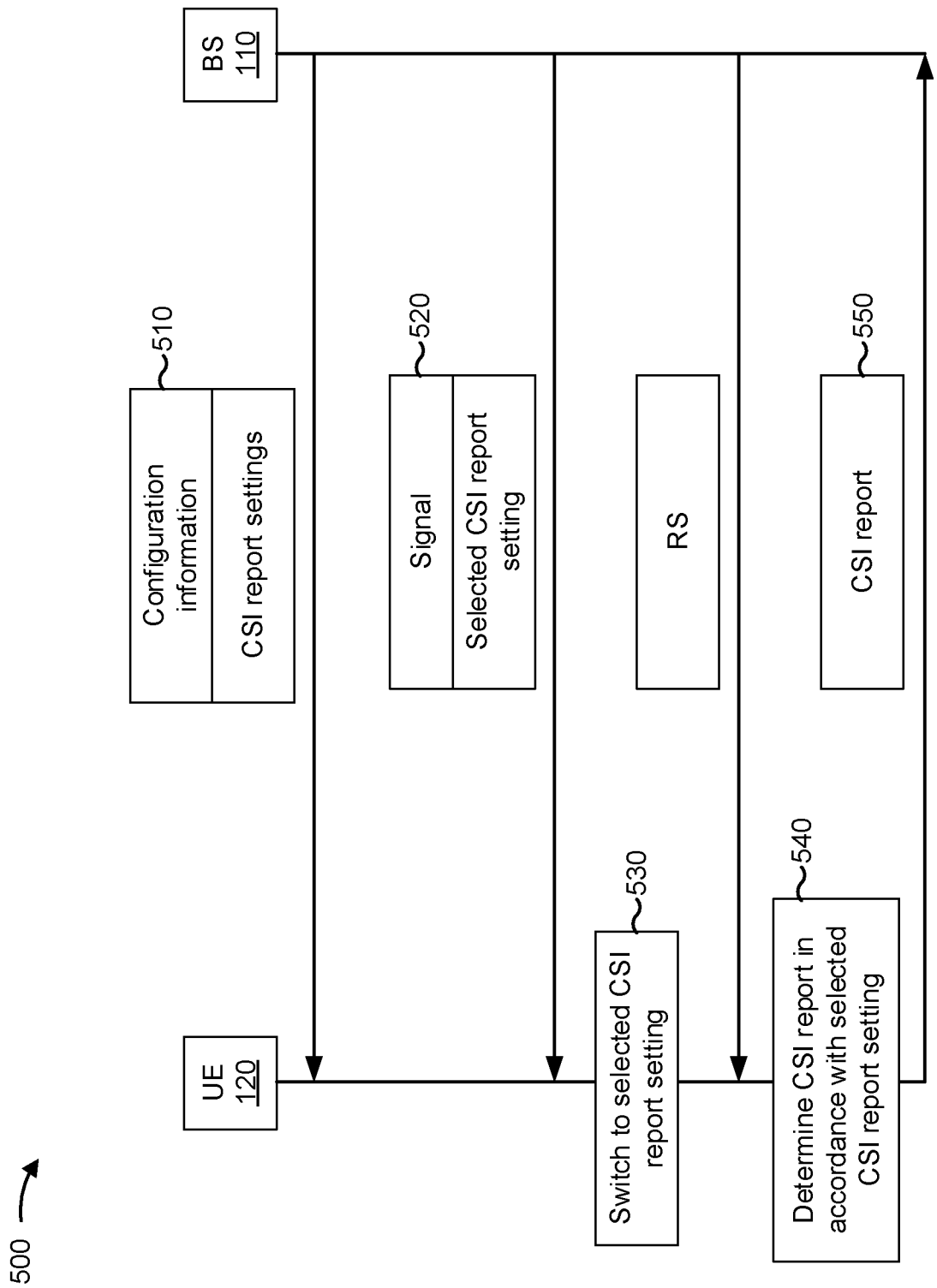
FIG. 5 is a diagram illustrating an example of dynamic indication for a periodic CSI report, in accordance with the present disclosure.

FIG. 5 is a diagram illustrating an example 500 of dynamic indication for a periodic CSI report, in accordance with the present disclosure. As shown, example 500 includes a UE 120 and a BS 110. In some aspects, the UE 120 and the BS 110 may communicate on a band in a frequency range that uses beamforming, such as Frequency Range (FR2) and/or the like.

As shown by reference number 510, the BS 110 may provide configuration information to the UE 120. The configuration information may identify two or more CSI report settings, such as for periodic CSI reporting. In some aspects, the two or more CSI report settings may indicate one or more parameters or resources associated with a CSI report (e.g., a parameter used to determine CSI feedback, a resource used to determine CSI feedback, a resource used to transmit CSI feedback, and/or the like). In some aspects, one of the signaled CSI report settings may identify a single parameter or a set of parameters to be used in relation to another CSI reporting configuration. For example, the CSI report setting may indicate a modification to another CSI reporting configuration (e.g., a baseline CSI reporting configuration). In this case, the UE 120 may determine a CSI report in accordance with the baseline CSI reporting configuration until receiving signaling indicating to use the modification. Thereafter, the UE 120 may use the modified CSI reporting configuration. In some aspects, the two or more CSI report settings may include separate CSI reporting configurations that each define a complete set of parameters for determining and/or reporting CSI.

In some aspects, a CSI report setting (e.g., a CSI report setting associated with a coverage enhancement mode) may indicate one or more repetitions of a physical uplink control channel (PUCCH) used to transmit the CSI report. In some aspects, a CSI report setting (e.g., a CSI report setting associated with a coverage enhancement mode) may include, or may be, a configured grant for CSI report transmission on a physical uplink shared channel (PUSCH).

In some aspects, a CSI reporting configuration for the periodic CSI report may indicate a configured grant. For example, the CSI reporting configuration may be linked to the configured grant. In this case, the UE 120 may use the configured grant for CSI reporting based at least in part on signaling indicating a selected CSI report setting. For example, the configured grant may be associated with the selected CSI report setting based at least in part on the CSI reporting configuration.

As shown by reference number 520, the UE 120 may receive a signal indicating to switch to a selected CSI report setting, of the two or more CSI report settings. For example, the signal may be provided via DCI, a MAC control element (MAC-CE), and/or the like. Thus, the signal may be considered dynamic signaling. In some aspects, the signal may indicate a configured grant. For example, the signal may carry a configured grant on a PUSCH. In this case, the UE 120 may use the configured grant for CSI report transmission on the PUSCH. In some aspects, the BS 110 may determine the selected CSI report setting based at least in part on channel conditions at the UE 120, based at least in part on failing to receive a CSI report from the UE 120, and/or the like. In some aspects, the signal may explicitly identify the selected CSI report setting. In some aspects, the signal may indicate to switch a CSI report setting without explicitly indicating the CSI report setting. For example, the UE 120 may switch between two or more CSI report settings in an order based at least in part on receiving the signal, which reduces overhead associated with indicating the CSI report setting.

As shown by reference number 530, the UE 120 may switch to the selected CSI report setting. For example, the UE 120 may use a CSI reporting configuration identified by the selected CSI report setting, or may modify a baseline CSI reporting configuration in accordance with the selected CSI report setting. As shown by reference number 540, the UE 120 may determine a CSI report in accordance with the selected CSI report setting. As shown by reference number 550, the UE 120 may transmit the CSI report in accordance with the selected CSI report setting. For example, the UE 120 may transmit the CSI report on a PUCCH (e.g., using one or more repetitions if the selected CSI report setting indicates to use the one or more repetitions) and/or a PUSCH (e.g., using one or more repetitions if the selected CSI report setting indicates to use the one or more repetitions). Thus, the UE 120 may perform periodic CSI reporting in accordance with a selected CSI report setting, of two or more configured CSI report settings. Thus, reliability of CSI reporting can be improved in cases of poor coverage, and efficiency of CSI reporting can be improved in cases of adequate coverage, relative to a semi-static scheme for CSI reporting configuration.

As indicated above, FIG. 5 is provided as an example. Other examples may differ from what is described with respect to FIG. 5.

Figure 6:
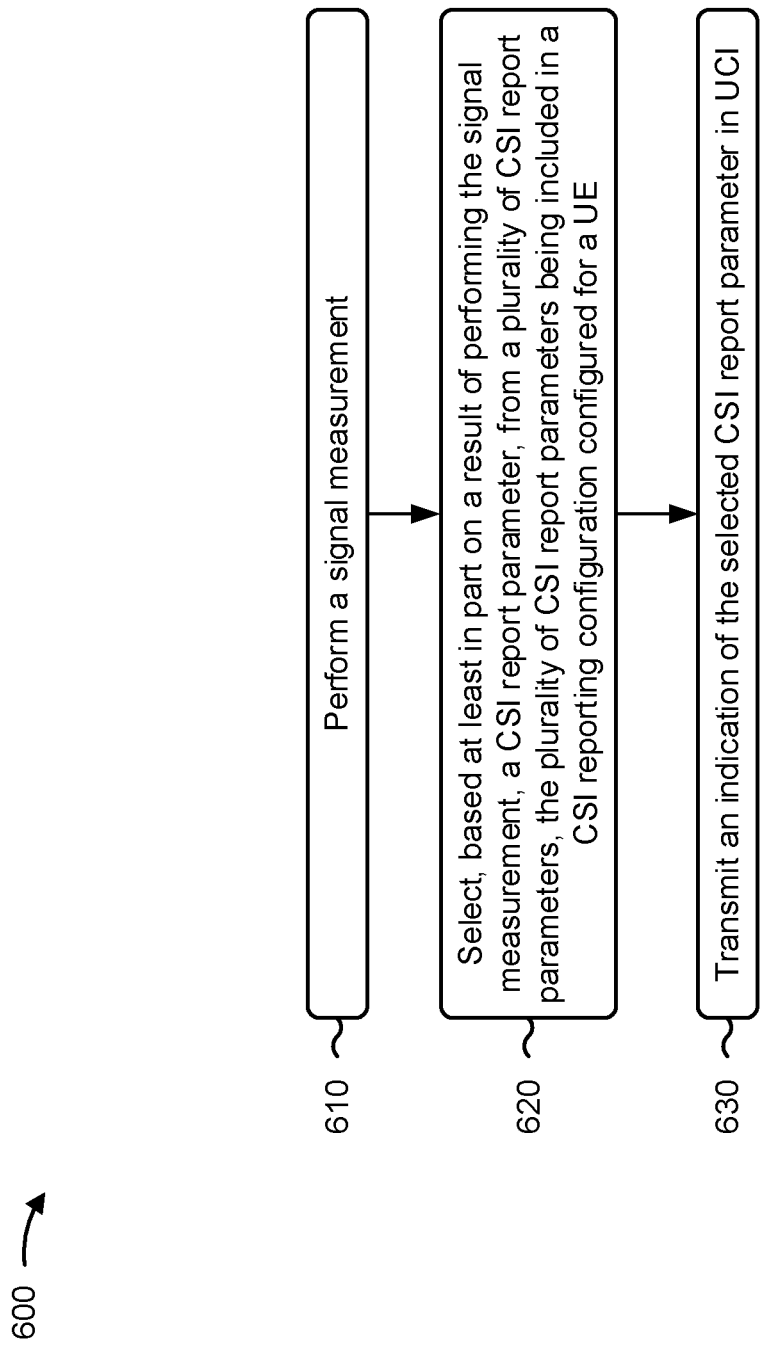
FIG. 6 is a diagram illustrating an example process performed, for example, by a user equipment, in accordance with the present disclosure.

FIG. 6 is a diagram illustrating an example process 600 performed, for example, by a UE, in accordance with the present disclosure. Example process 600 is an example where the UE (e.g., UE 120 and/or the like) performs operations associated with selection of a CSI report parameter by a UE and indication via UCI.

As shown in FIG. 6, in some aspects, process 600 may include performing a signal measurement (block 610). For example, the UE (e.g., using receive processor 258, transmit processor 264, controller/processor 280, memory 282, and/or the like) may perform a signal measurement, as described above.

As further shown in FIG. 6, in some aspects, process 600 may include selecting, based at least in part on a result of performing the signal measurement, a CSI report parameter, from a plurality of CSI report parameters, the plurality of CSI report parameters being included in a CSI reporting configuration configured for the UE (block 620). For example, the UE (e.g., using receive processor 258, transmit processor 264, controller/processor 280, memory 282, and/or the like) may select, based at least in part on a result of performing the signal measurement, a CSI report parameter, from a plurality of CSI report parameters, the plurality of CSI report parameters being included in a CSI reporting configuration configured for the UE, as described above.

As further shown in FIG. 6, in some aspects, process 600 may include transmitting an indication of the selected CSI report parameter in UCI (block 630). For example, the user equipment (e.g., using transmit processor 264, controller/processor 280, memory 282, and/or the like) may transmit an indication of the selected CSI report parameter in UCI, as described above.

Process 600 may include additional aspects, such as any single aspect or any combination of aspects described below and/or in connection with one or more other processes described elsewhere herein.

In a first aspect, process 600 includes receiving the CSI reporting configuration including the plurality of CSI report parameters.

In a second aspect, alone or in combination with the first aspect, the CSI reporting configuration is received via radio resource control signaling.

In a third aspect, alone or in combination with one or more of the first and second aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In a fourth aspect, alone or in combination with one or more of the first through third aspects, the reporting parameter is associated with at least one of whether CSI report repetition is to be performed, a periodicity for CSI reporting, or a payload size for CSI reporting.

In a fifth aspect, alone or in combination with one or more of the first through fourth aspects, the result of the signal measurement includes at least one of a reference signal received power value, a signal-to-interference-plus-noise ratio value, or a log-likelihood ratio quality value.

In a sixth aspect, alone or in combination with one or more of the first through fifth aspects, the UCI includes an indication of a length of a gap between the UCI and a start of CSI report repetition, or an indication of a length of a gap between the UCI and a start of a beam sweeping.

In a seventh aspect, alone or in combination with one or more of the first through sixth aspects, an indication of a length of a gap between the UCI and a start of CSI report repetition, or an indication of a length of a gap between the UCI and a start of a beam sweeping, is included in the CSI reporting configuration.

In an eighth aspect, alone or in combination with one or more of the first through seventh aspects, a PUCCH format or a PUCCH option to be used to indicate the selected CSI report parameter is preconfigured on the UE according to a wireless communication standard.

In a ninth aspect, alone or in combination with one or more of the first through eighth aspects, information that identifies a physical uplink control channel format to be used to indicate the selected CSI report parameter is included in the CSI reporting configuration.

In a tenth aspect, alone or in combination with one or more of the first through ninth aspects, an indication to perform the selection of the CSI report parameter, or information that identifies a physical uplink control channel format to be used to indicate the selected CSI report parameter, is received in downlink control information associated with triggering a semi-persistent CSI report.

In an eleventh aspect, alone or in combination with one or more of the first through tenth aspects, the selected CSI report parameter is selected based at least in part on criteria included in the CSI reporting configuration.

In a twelfth aspect, alone or in combination with one or more of the first through eleventh aspects, the criteria include a signal strength threshold, and the selected CSI report parameter is selected based at least in part on whether the result of the signal measurement satisfies the signal strength threshold.

In a thirteenth aspect, alone or in combination with one or more of the first through twelfth aspects, process 600 includes transmitting a CSI report based at least in part on the selected CSI report parameter.

In a fourteenth aspect, alone or in combination with one or more of the first through thirteenth aspects, the UCI includes an indication of a length of a gap between an initial transmission of a CSI report and a start of CSI report repetition, or an indication of a length of a gap between the initial transmission of the CSI report and a start of a beam sweeping.

In a fifteenth aspect, alone or in combination with one or more of the first through fourteenth aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
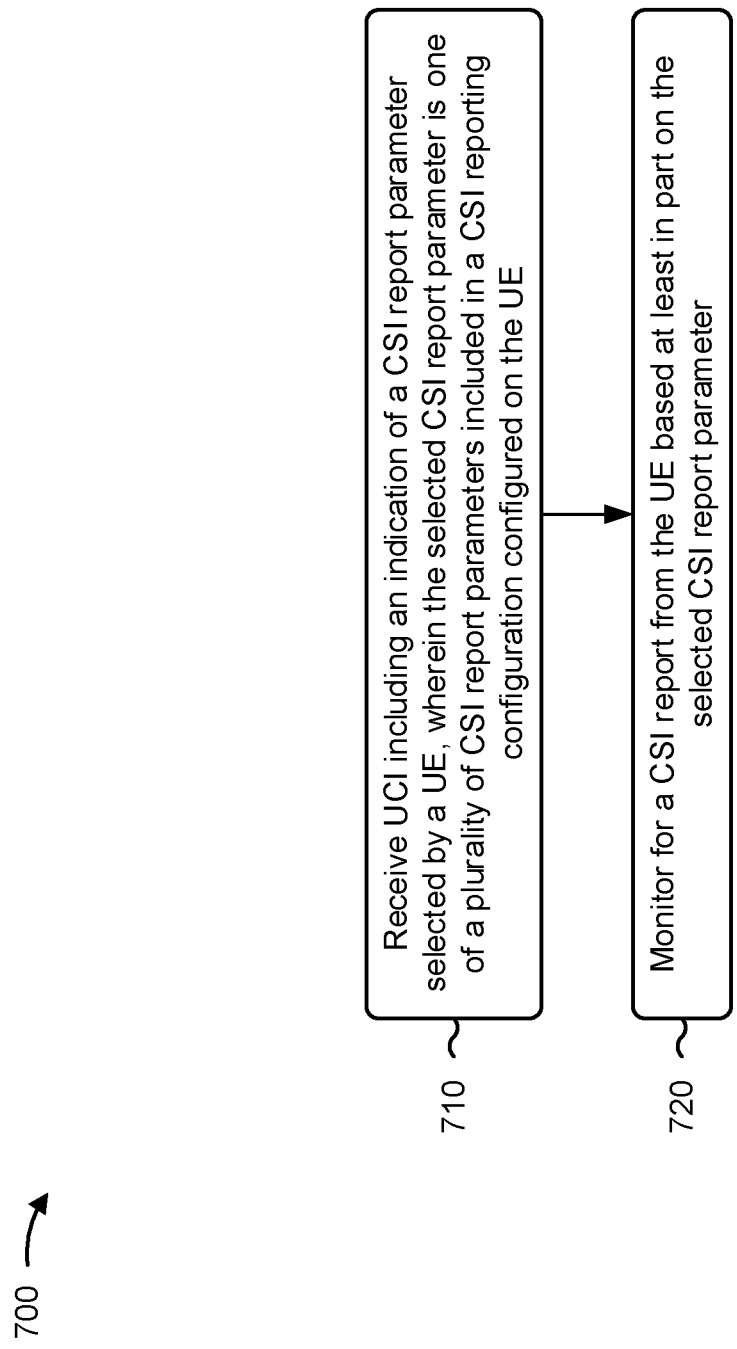
FIG. 7 is a diagram illustrating an example process performed, for example, by a base station, in accordance with the present disclosure.

FIG. 7 is a diagram illustrating an example process 700 performed, for example, by a base station, in accordance with the present disclosure. Example process 700 is an example where the base station (e.g., base station 110 and/or the like) performs operations associated with associated with selection of a CSI report parameter by a UE and indication via UCI.

As shown in FIG. 7, in some aspects, process 700 may include receiving UCI including an indication of a CSI report parameter selected by a UE, wherein the selected CSI report parameter is one of a plurality of CSI report parameters included in a CSI reporting configuration configured on the UE (block 710). For example, the base station (e.g., using receive processor 238, controller/processor 240, memory 242, and/or the like) may receive UCI including an indication of a CSI report parameter selected by a UE (e.g., a UE 120), as described above. In some aspects, the selected CSI report parameter is one of a plurality of CSI report parameters included in a CSI reporting configuration configured on the UE.

As further shown in FIG. 7, in some aspects, process 700 may include monitoring for a CSI report from the UE based at least in part on the selected CSI report parameter (block 720). For example, the base station (e.g., using receive processor 238, controller/processor 240, memory 242, and/or the like) may monitor for a CSI report from the UE based at least in part on the selected CSI report parameter, as described above.

Process 700 may include additional aspects, such as any single aspect or any combination of aspects described below and/or in connection with one or more other processes described elsewhere herein.

In a first aspect, process 700 includes transmitting the CSI reporting configuration including the plurality of CSI report parameters.

In a second aspect, alone or in combination with the first aspect, the CSI reporting configuration is transmitted via radio resource control signaling.

In a third aspect, alone or in combination with one or more of the first and second aspects, a first CSI report parameter of the plurality of CSI report parameters indicates a first setting for a reporting parameter, and a second CSI report parameter of the plurality of CSI report parameters indicates a second setting for the reporting parameter. Here, the selected CSI report parameter is either the first CSI report parameter or the second CSI report parameter.

In a fourth aspect, alone or in combination with one or more of the first through third aspects, the reporting parameter is associated with at least one of whether CSI report repetition is to be performed, a periodicity for CSI reporting, or a payload size for CSI reporting.

In a fifth aspect, alone or in combination with one or more of the first through fourth aspects, the UCI includes an indication of a length of a gap between the UCI and a start of CSI report repetition or an indication of a length of a gap between the UCI and a start of a beam sweeping.

In a sixth aspect, alone or in combination with one or more of the first through fifth aspects, an indication of a length of a gap between the UCI and a start of CSI report repetition, or an indication of a length of a gap between the UCI and a start of a beam sweeping, is included in the CSI reporting configuration.

In a seventh aspect, alone or in combination with one or more of the first through sixth aspects, a PUCCH format or a PUCCH option to be used to indicate the selected CSI report parameter is preconfigured on the UE according to a wireless communication standard.

In an eighth aspect, alone or in combination with one or more of the first through seventh aspects, information that identifies a physical uplink control channel format to be used to indicate the selected CSI report parameter is included in the CSI reporting configuration.

In a ninth aspect, alone or in combination with one or more of the first through eighth aspects, an indication to perform the selection of the CSI report parameter, or information that identifies a physical uplink control channel format to be used to indicate the selected CSI report parameter, is transmitted in downlink control information associated with triggering a semi-persistent CSI report.

In a tenth aspect, alone or in combination with one or more of the first through ninth aspects, the CSI reporting configuration includes criteria associated with selecting the CSI report parameter.

In an eleventh aspect, alone or in combination with one or more of the first through tenth aspects, the criteria includes a signal strength threshold associated with selecting the CSI report parameter based at least in part on a result of a signal measurement.

In a twelfth aspect, alone or in combination with one or more of the first through eleventh aspects, the UCI includes an indication of a length of a gap between an initial transmission of a CSI report and a start of CSI report repetition, or an indication of a length of a gap between the initial transmission of the CSI report and a start of a beam sweeping.

In a thirteenth aspect, alone or in combination with one or more of the first through twelfth aspects, an indication of a length of a gap between an initial transmission of a CSI report and a start of CSI report repetition, or an indication of a length of a gap between the initial transmission of the CSI report and a start of a beam sweeping, is included in the CSI reporting configuration.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
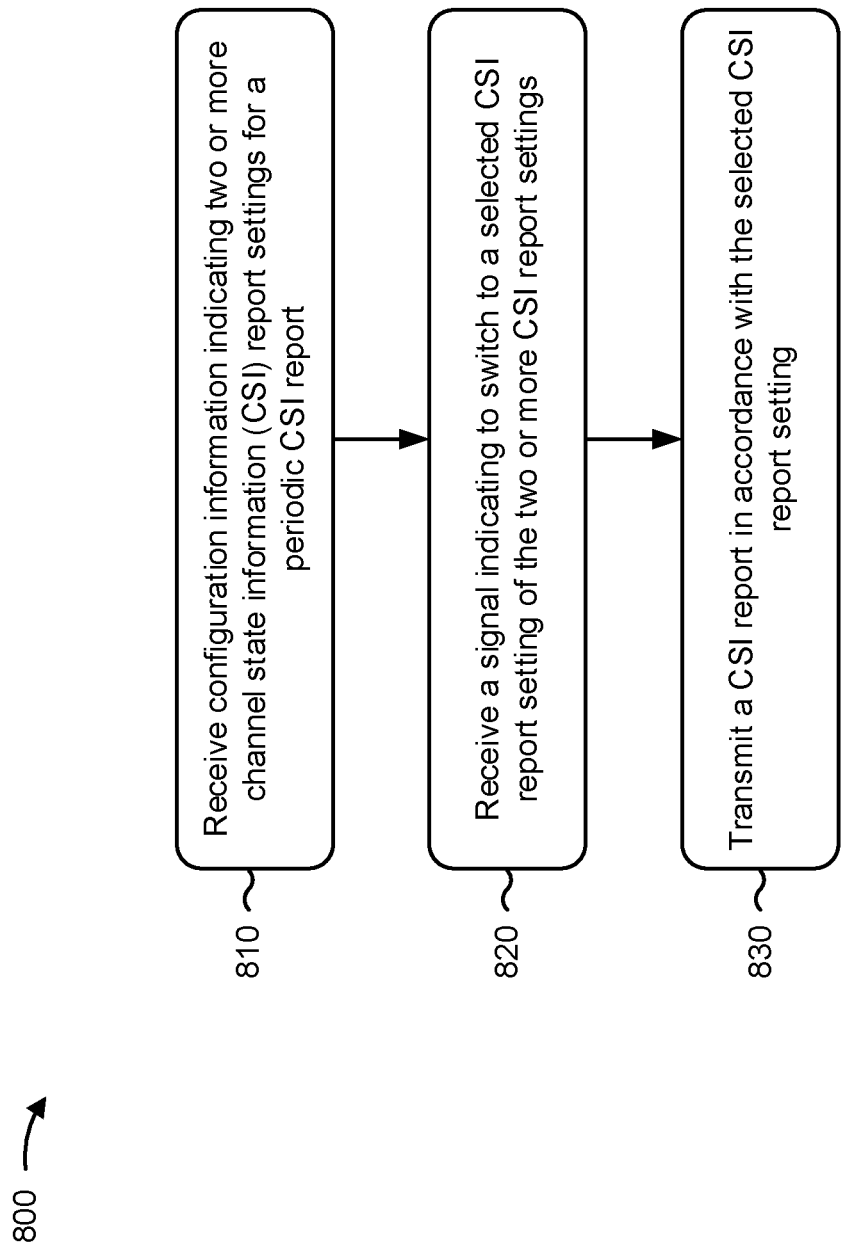
FIG. 8 is a diagram illustrating an example process performed, for example, by a user equipment, in accordance with the present disclosure.

FIG. 8 is a diagram illustrating an example process 800 performed, for example, by a UE, in accordance with the present disclosure. Example process 800 is an example where the UE (e.g., UE 120 and/or the like) performs operations associated with dynamic indication associated with a periodic CSI report.

As shown in FIG. 8, in some aspects, process 800 may include receiving configuration information indicating two or more channel state information (CSI) report settings for a periodic CSI report (block 810). For example, the UE (e.g., using antenna 252, DEMOD 254, MIMO detector 256, receive processor 258, controller/processor 280, and/or the like) may receive configuration information indicating two or more CSI report settings for a periodic CSI report, as described above.

As further shown in FIG. 8, in some aspects, process 800 may include receiving a signal indicating to switch to a selected CSI report setting of the two or more CSI report settings (block 820). For example, the UE (e.g., using antenna 252, DEMOD 254, MIMO detector 256, receive processor 258, controller/processor 280, and/or the like) may receive a signal indicating to switch to a selected CSI report setting of the two or more CSI report settings, as described above.

As further shown in FIG. 8, in some aspects, process 800 may include transmitting a CSI report in accordance with the selected CSI report setting (block 830). For example, the UE (e.g., using controller/processor 280, transmit processor 264, TX MIMO processor 266, MOD 254, antenna 252, and/or the like) may transmit a CSI report in accordance with the selected CSI report setting, as described above.

Process 800 may include additional aspects, such as any single aspect or any combination of aspects described below and/or in connection with one or more other processes described elsewhere herein.

In a first aspect, the selected CSI report setting is associated with a coverage enhancement configuration.

In a second aspect, alone or in combination with the first aspect, the selected CSI report setting is associated with multiple repetitions of an uplink control channel used to transmit the CSI report.

In a third aspect, alone or in combination with one or more of the first and second aspects, the signal indicates a configured grant for the CSI report.

In a fourth aspect, alone or in combination with one or more of the first through third aspects, the configured grant is associated with a plurality of transmission occasions for repetitions of the CSI report.

In a fifth aspect, alone or in combination with one or more of the first through fourth aspects, the selected CSI report setting is associated with a configured grant for the CSI report.

In a sixth aspect, alone or in combination with one or more of the first through fifth aspects, the configured grant is associated with a plurality of transmission occasions for repetitions of the CSI report.

In a seventh aspect, alone or in combination with one or more of the first through sixth aspects, the selected CSI report setting includes at least one of a CSI report parameter or a resource for transmitting the selected CSI report.

In an eighth aspect, alone or in combination with one or more of the first through seventh aspects, the selected CSI report setting is a periodic CSI report setting, and the periodic CSI report setting is linked to a configured grant for the CSI report.

In a ninth aspect, alone or in combination with one or more of the first through eighth aspects, the signal includes at least one of downlink control information or a medium access control control element.

In a tenth aspect, alone or in combination with one or more of the first through ninth aspects, process 800 includes switching to the selected CSI report setting.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
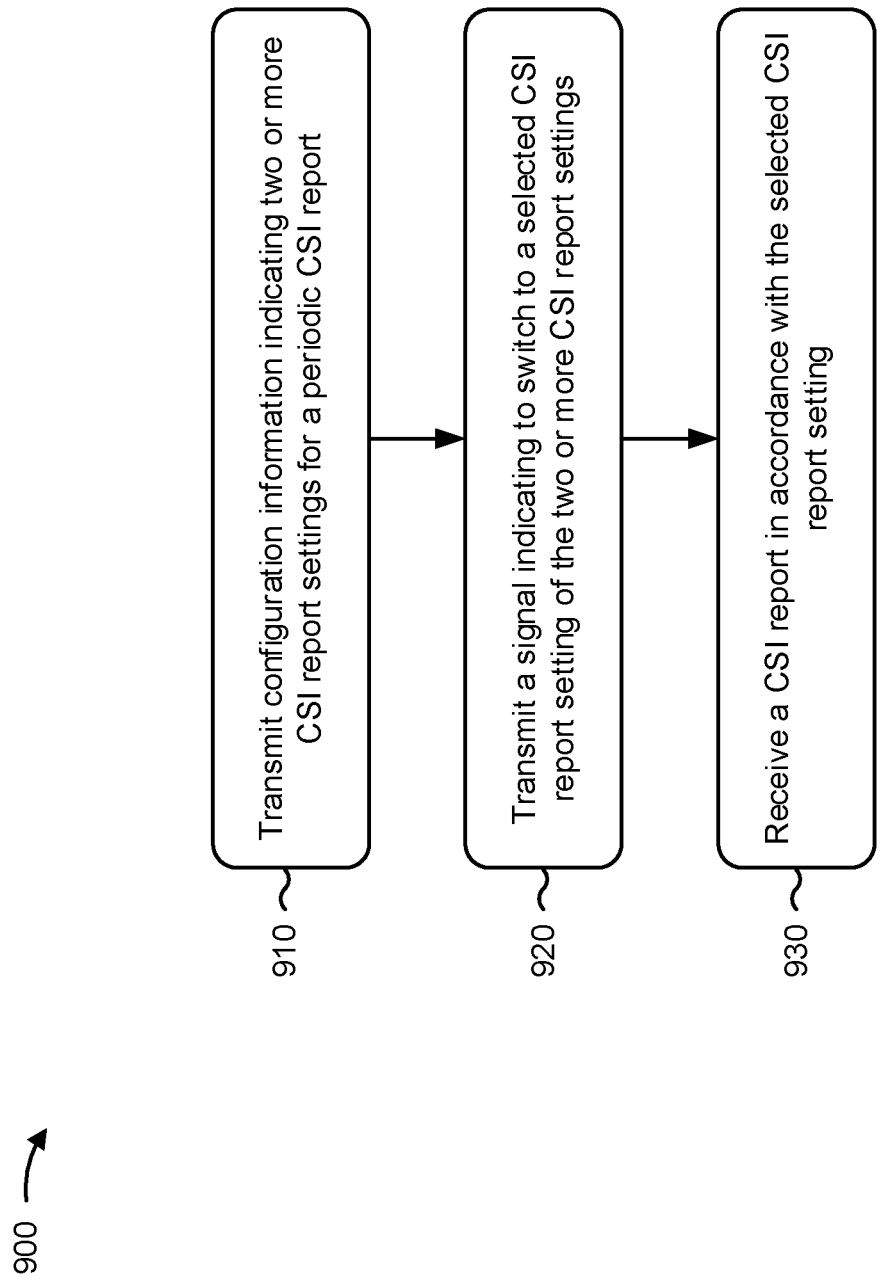
FIG. 9 is a diagram illustrating an example process performed, for example, by a base station, in accordance with the present disclosure.
Figure 10:
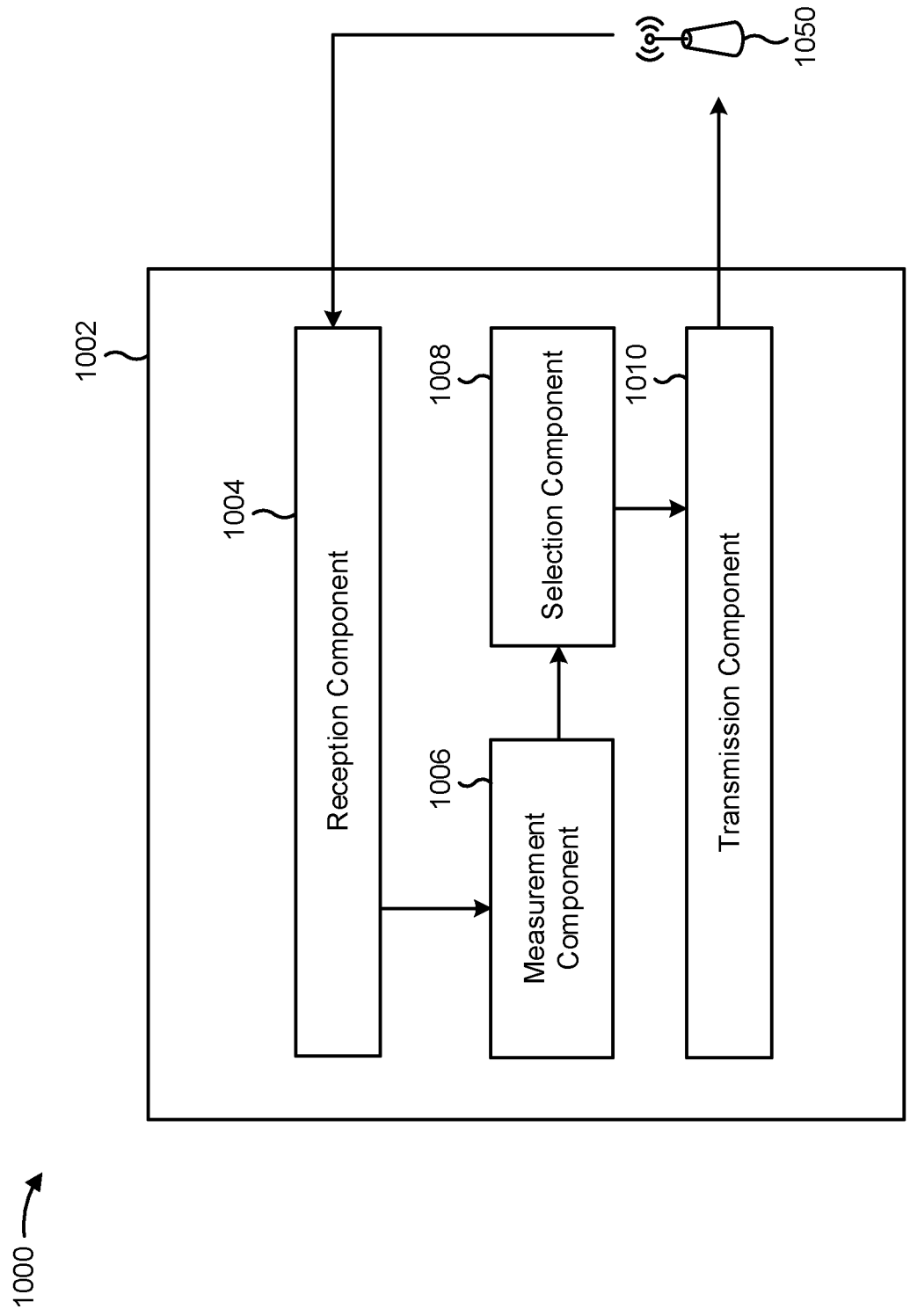
FIG. 10 is a conceptual data flow diagram illustrating a data flow between different components in an example apparatus, in accordance with the present disclosure.

FIG. 9 is a diagram illustrating an example process 900 performed, for example, by a base station, in accordance with the present disclosure. Example process 900 is an example where the base station (e.g., BS 110 and/or the like) performs operations associated with dynamic indication of a periodic CSI report setting.

As shown in FIG. 9, in some aspects, process 900 may include transmitting configuration information indicating two or more CSI report settings for a periodic CSI report (block 910). For example, the base station (e.g., using controller/processor 240, transmit processor 220, TX MIMO processor 230, MOD 232, antenna 234, and/or the like) may transmit configuration information indicating two or more CSI report settings for a periodic CSI report, as described above.

As further shown in FIG. 9, in some aspects, process 900 may include transmitting a signal indicating to switch to a selected CSI report setting of the two or more CSI report settings (block 920). For example, the base station (e.g., using controller/processor 240, transmit processor 220, TX MIMO processor 230, MOD 232, antenna 234, and/or the like) may transmit a signal indicating to switch to a selected CSI report setting of the two or more CSI report settings, as described above.

As further shown in FIG. 9, in some aspects, process 900 may include receiving a CSI report in accordance with the selected CSI report setting (block 930). For example, the base station (e.g., using antenna 234, DEMOD 232, MIMO detector 236, receive processor 238, controller/processor 240, and/or the like) may receive a CSI report in accordance with the selected CSI report setting, as described above.

Process 900 may include additional aspects, such as any single aspect or any combination of aspects described below and/or in connection with one or more other processes described elsewhere herein.

In a first aspect, the selected CSI report setting is associated with a coverage enhancement configuration.

In a second aspect, alone or in combination with the first aspect, the selected CSI report setting is associated with multiple repetitions of an uplink control channel used to transmit the CSI report.

In a third aspect, alone or in combination with one or more of the first and second aspects, the signal indicates a configured grant for the CSI report.

In a fourth aspect, alone or in combination with one or more of the first through third aspects, the configured grant is associated with a plurality of transmission occasions for repetitions of the CSI report.

In a fifth aspect, alone or in combination with one or more of the first through fourth aspects, the selected CSI report setting is associated with a configured grant for the CSI report.

In a sixth aspect, alone or in combination with one or more of the first through fifth aspects, the configured grant is associated with a plurality of transmission occasions for repetitions of the CSI report.

In a seventh aspect, alone or in combination with one or more of the first through sixth aspects, the selected CSI report setting includes at least one of a CSI report parameter or a resource for transmitting the selected CSI report.

In an eighth aspect, alone or in combination with one or more of the first through seventh aspects, the selected CSI report setting is a periodic CSI report setting, and the periodic CSI report setting is linked to a configured grant for the CSI report.

In a ninth aspect, alone or in combination with one or more of the first through eighth aspects, the signal includes at least one of downlink control information or a medium access control control element.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 11:
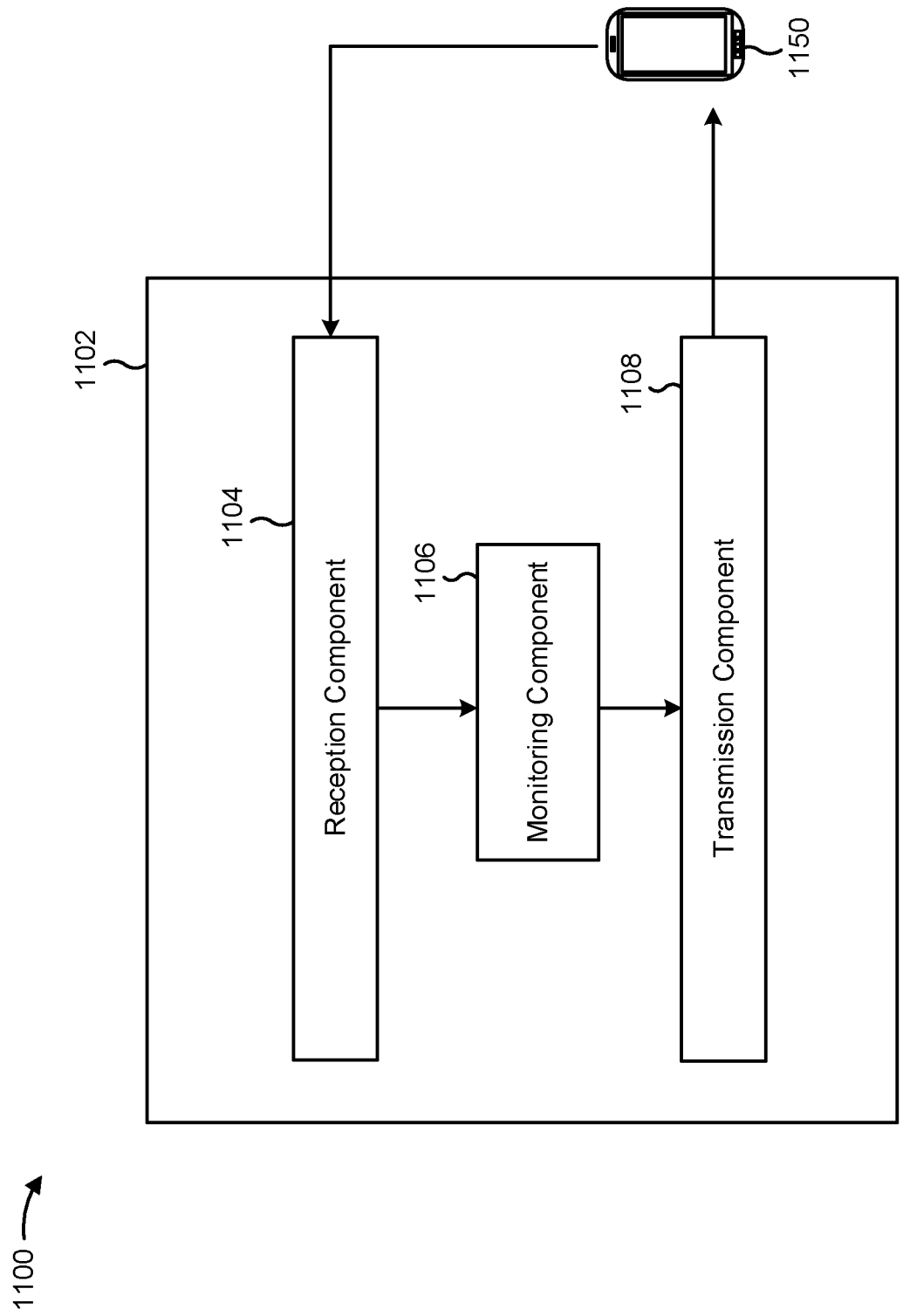
FIG. 11 is a conceptual data flow diagram illustrating a data flow between different components in an example apparatus, in accordance with the present disclosure.

FIG. 11 is a conceptual data flow diagram 1100 illustrating a data flow between different components in an example apparatus 1102. The apparatus 1102 may be a UE (e.g., UE 120). In some aspects, the apparatus 1102 includes a reception component 1104, a measurement component 1106, a selection component 1108, and/or a transmission component 1110.

In some aspects, the measurement component 1106 may perform a signal measurement, as described above. In some aspects, the selection component 1108 may select, based at least in part on a result of performing the signal measurement, a CSI report parameter, from a plurality of CSI report parameters, the plurality of CSI report parameters being included in a CSI reporting configuration configured for the apparatus, as described above. In some aspects, the transmission component 1110 may transmit an indication of the selected CSI report parameter in UCI, as described above.

The apparatus may include additional components that perform each of the blocks of the algorithm in the aforementioned process 400 of FIG. 4 and/or the like. Each block in the aforementioned process 400 of FIG. 4 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 11.

FIG. 12 is a conceptual data flow diagram 1200 illustrating a data flow between different components in an example apparatus 1202. The apparatus 1202 may be a base station (e.g., base station 110). In some aspects, the apparatus 1202 includes a reception component 1204, a monitoring component 1206, and/or a transmission component 1208.

In some aspects, the reception component 1204 may receive UCI including an indication of a CSI report parameter selected by a UE (e.g., UE 120, apparatus 602, or the like), wherein the selected CSI report parameter is one of a plurality of CSI report parameters included in a CSI reporting configuration configured on the UE, as described above. In some aspects, the monitoring component 1206 may monitor for a CSI report from the UE based at least in part on the selected CSI report parameter, as described above.

The apparatus may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of components (e.g., one or more components) shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving configuration information indicating a plurality of channel state information (CSI) report settings; selecting, based at least in part on at least one of a result of performing a signal measurement or receiving a signal, a CSI report setting, from the plurality of CSI report settings; and transmitting a CSI report in accordance with the selected CSI report setting.

Aspect 2: The method of Aspect 1, further comprising: performing the signal measurement.

Aspect 3: The method of any of Aspects 1-2, wherein the plurality of CSI report settings are included in a CSI reporting configuration configured for the UE.

Aspect 4: The method of any of Aspects 1-3, further comprising: transmitting an indication of the selected CSI report setting in uplink control information (UCI).

Aspect 5: The method of Aspect 4, wherein the UCI includes an indication of a length of a gap between the UCI and a start of CSI report repetition, or an indication of a length of a gap between the UCI and a start of a beam sweeping.

Aspect 6: The method of Aspect 4, wherein an indication of a length of a gap between the UCI and a start of CSI report repetition, or an indication of a length of a gap between the UCI and a start of a beam sweeping, is included in the CSI reporting configuration.

Aspect 7: The method of Aspect 4, wherein the UCI includes an indication of a length of a gap between an initial transmission of a CSI report and a start of CSI report repetition, or an indication of a length of a gap between the initial transmission of the CSI report and a start of a beam sweeping.

Aspect 8: The method of Aspect 4, wherein an indication of a length of a gap between an initial transmission of a CSI report and a start of CSI report repetition, or an indication of a length of a gap between the initial transmission of the CSI report and a start of a beam sweeping, is included in the CSI reporting configuration.

Aspect 9: The method of any of Aspects 1-8, further comprising: receiving the signal, wherein the signal indicates to switch to the selected CSI report setting.

Aspect 10: The method of Aspect 9, wherein receiving the signal is based at least in part on the CSI report being a periodic CSI report.

Aspect 11: The method of any of Aspects 1-10, wherein a first CSI report setting of the plurality of CSI report setting indicates a first setting for a reporting parameter, and a second CSI report setting of the plurality of CSI report settings indicates a second setting for the reporting parameter, wherein the selected CSI report setting is associated with either the first setting or the second setting.

Aspect 12: The method of Aspect 11, wherein the reporting parameter is associated with at least one of: whether CSI report repetition is to be performed, a periodicity for CSI reporting, or a payload size for CSI reporting.

Aspect 13: The method of any of Aspects 1-12, wherein information that identifies a physical uplink control channel format to be used to indicate the selected CSI report setting is included in the configuration information.

Aspect 14: The method of any of Aspects 1-13, wherein an indication to perform the selection of the CSI report setting, or information that identifies a physical uplink control channel format to be used to indicate the selected CSI report setting, is received in downlink control information associated with triggering a semi-persistent CSI report.

Aspect 15: The method of any of Aspects 1-14, wherein the selected CSI report setting is selected based at least in part on criteria included in the configuration information.

Aspect 16: The method of any of Aspects 1-15, wherein the selected CSI report setting is associated with a coverage enhancement configuration.

Aspect 17: The method of any of Aspects 1-16, wherein the selected CSI report setting is associated with multiple repetitions of an uplink control channel used to transmit the CSI report.

Aspect 18: The method of any of Aspects 1-17, wherein the signal indicates a configured grant for the CSI report, and wherein the selected CSI report setting is associated with the configured grant for the CSI report.

Aspect 19: The method of any of Aspects 1-18, wherein the selected CSI report setting includes at least one of a CSI report parameter or a resource for transmitting the selected CSI report.

Aspect 20: The method of any of Aspects 1-19, wherein the selected CSI report setting is associated with a periodic CSI reporting configuration, and wherein the periodic CSI reporting configuration is linked to a configured grant for the CSI report.

Aspect 21: The method of any of Aspects 1-20, wherein the signal includes at least one of downlink control information or a medium access control control element.

Aspect 22: A method of wireless communication performed by a user equipment (UE), comprising: performing a signal measurement; selecting, based at least in part on a result of performing the signal measurement, a channel state information (CSI) report parameter, from a plurality of CSI report parameters, the plurality of CSI report parameters being included in a CSI reporting configuration configured for the UE; and transmitting an indication of the selected CSI report parameter in uplink control information (UCI).

Aspect 23: The method of Aspect 22, further comprising receiving the CSI reporting configuration including the plurality of CSI report parameters.

Aspect 24: The method of Aspect 23, wherein the CSI reporting configuration is received via radio resource control signaling.

Aspect 25: The method of any of Aspects 22-24, wherein a first CSI report parameter of the plurality of CSI report parameters indicates a first setting for a reporting parameter, and a second CSI report parameter of the plurality of CSI report parameters indicates a second setting for the reporting parameter, wherein the selected CSI report parameter is either the first CSI report parameter or the second CSI report parameter.

Aspect 26: The method of Aspect 25, wherein the reporting parameter is associated with at least one of: whether CSI report repetition is to be performed, a periodicity for CSI reporting, or a payload size for CSI reporting.

Aspect 27: The method of any of Aspects 22-26, wherein the result of the signal measurement includes at least one of: a reference signal received power value, a signal-to-interference-plus-noise ratio value, or a log-likelihood ratio quality value.

Aspect 28: The method of any of Aspects 22-27, wherein the UCI includes an indication of a length of a gap between the UCI and a start of CSI report repetition, or an indication of a length of a gap between the UCI and a start of a beam sweeping.

Aspect 29: The method of any of Aspects 22-28, wherein an indication of a length of a gap between the UCI and a start of CSI report repetition, or an indication of a length of a gap between the UCI and a start of a beam sweeping, is included in the CSI reporting configuration.

Aspect 30: The method of any of Aspects 22-29, wherein the UCI includes an indication of a length of a gap between an initial transmission of a CSI report and a start of CSI report repetition, or an indication of a length of a gap between the initial transmission of the CSI report and a start of a beam sweeping.

Aspect 31: The method of any of Aspects 22-30, wherein an indication of a length of a gap between an initial transmission of a CSI report and a start of CSI report repetition, or an indication of a length of a gap between the initial transmission of the CSI report and a start of a beam sweeping, is included in the CSI reporting configuration.

Aspect 32: The method of any of Aspects 22-31, wherein a physical uplink control channel (PUCCH) format or a PUCCH option to be used to indicate the selected CSI report parameter is preconfigured on the UE according to a wireless communication standard.

Aspect 33: The method of any of Aspects 22-32, wherein information that identifies a physical uplink control channel format to be used to indicate the selected CSI report parameter is included in the CSI reporting configuration.

Aspect 34: The method of any of Aspects 22-33, wherein an indication to perform the selection of the CSI report parameter, or information that identifies a physical uplink control channel format to be used to indicate the selected CSI report parameter, is received in downlink control information associated with triggering a semi-persistent CSI report.

Aspect 35: The method of any of Aspects 22-34, wherein the selected CSI report parameter is selected based at least in part on criteria included in the CSI reporting configuration.

Aspect 36: The method of Aspect 35, wherein the criteria include a signal strength threshold, and wherein the selected CSI report parameter is selected based at least in part on whether the result of the signal measurement satisfies the signal strength threshold.

Aspect 37: The method of any of Aspects 22-36, further comprising transmitting a CSI report based at least in part on the selected CSI report parameter.

Aspect 38: A method of wireless communication performed by a user equipment (UE), comprising: receiving configuration information indicating two or more channel state information (CSI) report settings for a periodic CSI report; receiving a signal indicating to switch to a selected CSI report setting of the two or more CSI report settings; and transmitting a CSI report in accordance with the selected CSI report setting.

Aspect 39: The method of Aspect 38, wherein the selected CSI report setting is associated with a coverage enhancement configuration.

Aspect 40: The method of any of Aspects 38-39, wherein the selected CSI report setting is associated with multiple repetitions of an uplink control channel used to transmit the CSI report.

Aspect 41: The method of any of Aspects 38-40, wherein the signal indicates a configured grant for the CSI report.

Aspect 42: The method of Aspect 41, wherein the configured grant is associated with a plurality of transmission occasions for repetitions of the CSI report.

Aspect 43: The method of any of Aspects 38-42, wherein the selected CSI report setting is associated with a configured grant for the CSI report.

Aspect 44: The method of Aspect 43, wherein the configured grant is associated with a plurality of transmission occasions for repetitions of the CSI report.

Aspect 45: The method of any of Aspects 38-44, wherein the selected CSI report setting includes at least one of a CSI report parameter or a resource for transmitting the selected CSI report.

Aspect 46: The method of any of Aspects 38-45, wherein the selected CSI report setting is associated with a periodic CSI reporting configuration, and wherein the periodic CSI reporting configuration is linked to a configured grant for the CSI report.

Aspect 47: The method of any of Aspects 38-46, wherein the signal includes at least one of downlink control information or a medium access control control element.

Aspect 48: The method of any of Aspects 38-47, further comprising: switching to the selected CSI report setting.

Aspect 49: An apparatus for wireless communication at a device, comprising a processor; memory coupled with the processor; and instructions stored in the memory and executable by the processor to cause the apparatus to perform the method of one or more Aspects of Aspects 1-48.

Aspect 50: A device for wireless communication, comprising a memory and one or more processors coupled to the memory, the memory and the one or more processors configured to perform the method of one or more Aspects of Aspects 1-48.

Aspect 51: An apparatus for wireless communication, comprising at least one means for performing the method of one or more Aspects of Aspects 1-48.

Aspect 52: A non-transitory computer-readable medium storing code for wireless communication, the code comprising instructions executable by a processor to perform the method of one or more Aspects of Aspects 1-48.

Aspect 53: A non-transitory computer-readable medium storing a set of instructions for wireless communication, the set of instructions comprising one or more instructions that, when executed by one or more processors of a device, cause the device to perform the method of one or more Aspects of Aspects 1-48.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   performing a signal measurement;
   selecting, based at least in part on a result of performing the signal measurement, a channel state information (CSI) report parameter indicating at least one of whether CSI report repetition is to be performed, a periodicity for CSI reporting, or a payload size for CSI reporting, the selection of the CSI report parameter being from a plurality of CSI report parameters, the plurality of CSI report parameters being included in a CSI reporting configuration configured for the UE; and
   transmitting an indication of the selected CSI report parameter in uplink control information (UCI).

2. The method of claim 1, further comprising receiving the CSI reporting configuration including the plurality of CSI report parameters.

3. The method of claim 2, wherein the CSI reporting configuration is received via radio resource control signaling.

4. The method of claim 1, wherein a first CSI report parameter of the plurality of CSI report parameters indicates a first setting for a reporting parameter, and a second CSI report parameter of the plurality of CSI report parameters indicates a second setting for the reporting parameter,
   wherein the selected CSI report parameter is either the first CSI report parameter or the second CSI report parameter.

5. The method of claim 1, wherein the result of the signal measurement includes at least one of:
   a reference signal received power value,
   a signal-to-interference-plus-noise ratio value, or
   a log-likelihood ratio quality value.

6. The method of claim 1, wherein the UCI includes an indication of a length of a gap between the UCI and a start of CSI report repetition, or an indication of a length of a gap between the UCI and a start of a beam sweeping.

7. The method of claim 1, wherein an indication of a length of a gap between the UCI and a start of CSI report repetition, or an indication of a length of a gap between the UCI and a start of a beam sweeping, is included in the CSI reporting configuration.

8. The method of claim 1, wherein the UCI includes an indication of a length of a gap between an initial transmission of a CSI report and a start of CSI report repetition, or an indication of a length of a gap between the initial transmission of the CSI report and a start of a beam sweeping.

9. The method of claim 1, wherein an indication of a length of a gap between an initial transmission of a CSI report and a start of CSI report repetition, or an indication of a length of a gap between the initial transmission of the CSI report and a start of a beam sweeping, is included in the CSI reporting configuration.

10. The method of claim 1, wherein a physical uplink control channel (PUCCH) format or a PUCCH option to be used to indicate the selected CSI report parameter is preconfigured on the UE according to a wireless communication standard.

11. The method of claim 1, wherein information that identifies a physical uplink control channel format to be used to indicate the selected CSI report parameter is included in the CSI reporting configuration.

12. The method of claim 1, wherein an indication to perform the selection of the CSI report parameter, or information that identifies a physical uplink control channel format to be used to indicate the selected CSI report parameter, is received in downlink control information associated with triggering a semi-persistent CSI report.

13. The method of claim 1, wherein the selected CSI report parameter is selected based at least in part on criteria included in the CSI reporting configuration.

14. The method of claim 13, wherein the criteria include a signal strength threshold, and wherein the selected CSI report parameter is selected based at least in part on whether the result of the signal measurement satisfies the signal strength threshold.

15. The method of claim 1, further comprising transmitting a CSI report based at least in part on the selected CSI report parameter.

16. The method of claim 1, wherein selecting the CSI report parameter comprises:
   selecting, from a first CSI report parameter indicating that CSI report repetition is enabled and a second CSI report parameter indicating that CSI report repetition is disabled, the CSI report parameter indicating whether CSI report repetition is to be performed;
   selecting, from a third CSI report parameter indicating a first periodicity for CSI reporting and a fourth CSI report parameter indicating a second periodicity for CSI reporting, the CSI report parameter indicating the periodicity for CSI reporting; or
   selecting, from a fifth CSI report parameter indicating a first payload size for CSI reporting and a sixth CSI report parameter indicating a second payload size for CSI reporting, the CSI report parameter indicating the payload size for CSI reporting.

17. A method of wireless communication performed by a user equipment (UE), comprising:
   receiving configuration information indicating two or more periodic channel state information (CSI) report settings for periodic CSI reporting;
   receiving a signal indicating to switch to a selected periodic CSI report setting of the two or more periodic CSI report settings; and
   transmitting a CSI report in accordance with the selected periodic CSI report setting.

18. The method of claim 17, wherein the selected periodic CSI report setting is associated with a coverage enhancement configuration.

19. The method of claim 17, wherein the selected periodic CSI report setting is associated with multiple repetitions of an uplink control channel used to transmit the CSI report.

20. The method of claim 17, wherein the signal indicates a configured grant for the CSI report.

21. The method of claim 20, wherein the configured grant is associated with a plurality of transmission occasions for repetitions of the CSI report.

22. The method of claim 17, wherein the selected periodic CSI report setting is associated with a configured grant for the CSI report.

23. The method of claim 22, wherein the configured grant is associated with a plurality of transmission occasions for repetitions of the CSI report.

24. The method of claim 17, wherein the selected periodic CSI report setting includes at least one of a CSI report parameter or a resource for transmitting the selected periodic CSI report.

25. The method of claim 17, wherein the selected periodic CSI report setting is associated with a periodic CSI reporting configuration, and wherein the periodic CSI reporting configuration is linked to a configured grant for the CSI report.

26. The method of claim 17, wherein the signal includes at least one of downlink control information or a medium access control control element.

27. The method of claim 17, further comprising:
   switching to the selected periodic CSI report setting.

28. A user equipment (UE) for wireless communication, comprising:
   a memory; and
   one or more processors, coupled to the memory, configured to:
      perform a signal measurement;
      select, based at least in part on a result of performing the signal measurement, a channel state information (CSI) report parameter indicating at least one of whether CSI report repetition is to be performed, a periodicity for CSI reporting, or a payload size for CSI reporting, the selection of the CSI report parameter being from a plurality of CSI report parameters, the plurality of CSI report parameters being included in a CSI reporting configuration configured for the UE; and
      transmit an indication of the selected CSI report parameter in uplink control information (UCI).

29. The UE of claim 28, wherein the one or more processors are further configured to receive the CSI reporting configuration including the plurality of CSI report parameters.

30. A user equipment (UE) for wireless communication, comprising:
   a memory; and
   one or more processors, coupled to the memory, configured to:
      receive configuration information indicating two or more periodic channel state information (CSI) report settings for periodic CSI reporting;
      receive a signal indicating to switch to a selected periodic CSI report setting of the two or more periodic CSI report settings; and
      transmit a CSI report in accordance with the selected periodic CSI report setting.

* * * * *